(12) United States Patent
Hong et al.

(10) Patent No.: US 12,474,170 B2
(45) Date of Patent: Nov. 18, 2025

(54) TOPOMETRIC MAP BASED AUTONOMOUS NAVIGATION FOR INVENTORY DRONE

(71) Applicant: Brookhurst Garage, Inc., San Jose, CA (US)

(72) Inventors: Soon Hac Hong, San Jose, CA (US); Yishun Cheng, Cupertino, CA (US); Young Joon Kim, San Jose, CA (US)

(73) Assignee: Brookhurst Garage, Inc., San Jose, CA (US)

( * ) Notice: Subject to any disclaimer, the term of this patent is extended or adjusted under 35 U.S.C. 154(b) by 319 days.

(21) Appl. No.: 18/088,470

(22) Filed: Dec. 23, 2022

(65) Prior Publication Data

US 2024/0210177 A1 Jun. 27, 2024

(51) Int. Cl.
*G01C 21/20* (2006.01)
*G01C 21/00* (2006.01)
*G06Q 10/087* (2023.01)

(52) U.S. Cl.
CPC ....... *G01C 21/206* (2013.01); *G01C 21/3804* (2020.08); *G06Q 10/087* (2013.01)

(58) Field of Classification Search
CPC . G01C 21/206; G01C 21/3804; G06Q 10/087
USPC ......................................................... 701/24
See application file for complete search history.

(56) References Cited

U.S. PATENT DOCUMENTS

| | | | |
|---|---|---|---|
| 2,178,647 A * | 11/1939 | Raymond | B62B 3/008 280/43.12 |
| 9,908,702 B2 | 3/2018 | Elazary et al. | |
| 10,210,212 B2 | 2/2019 | Wang et al. | |
| 2008/0294338 A1 | 11/2008 | Doh et al. | |
| 2013/0131865 A1* | 5/2013 | Yamane | B25J 9/1692 700/254 |
| 2016/0071278 A1* | 3/2016 | Leonard | G06T 7/579 348/47 |
| 2019/0171220 A1 | 6/2019 | Elazary et al. | |

(Continued)

FOREIGN PATENT DOCUMENTS

| CN | 106527448 A | 3/2017 |
|---|---|---|
| CN | 112161618 A | 1/2021 |

(Continued)

OTHER PUBLICATIONS

PCT International Search Report and Written Opinion, PCT Application No. PCT/US2023/083102, Apr. 2, 2024, 10 pages.

(Continued)

*Primary Examiner* — Andrew R Dyer
(74) *Attorney, Agent, or Firm* — Fenwick & West LLP

(57) ABSTRACT

A topometric map that enables autonomous navigation of an inventory robot. The topometric map is generated using the layout of a storage site and is made up of vertices and edges. The vertices are generated at pallet locations and other structural locations, and edges are generated between neighboring vertices. Vertices and edges have associated metrics that aid in the routing of the robot. The metrics of the vertices and edges may be updated as the robot navigates through the storage site by using a perception engine and state estimator. The metrics of the edges can be used to calculate an energy cost. The robot determines a shortest path between a source and destination vertex based on the energy cost associated with each edge.

20 Claims, 11 Drawing Sheets

(56) References Cited

U.S. PATENT DOCUMENTS

| | | | |
|---|---|---|---|
| 2020/0047340 A1* | 2/2020 | Hong | G01S 17/894 |
| 2020/0380876 A1* | 12/2020 | Sachdeva | G08G 5/0026 |
| 2022/0066456 A1* | 3/2022 | Ebrahimi Afrouzi | ........... |
| | | | G06F 3/04883 |
| 2022/0191542 A1* | 6/2022 | Ahmadyan | H04N 19/105 |
| 2022/0351133 A1 | 11/2022 | Akiona et al. | |
| 2022/0390950 A1 | 12/2022 | Yamauchi | |
| 2022/0390954 A1 | 12/2022 | Klingensmith | |

FOREIGN PATENT DOCUMENTS

| | | |
|---|---|---|
| CN | 115824222 A | 3/2023 |
| CN | 116135736 A | 5/2023 |
| WO | WO 2020/076422 A2 | 4/2020 |

OTHER PUBLICATIONS

PCT International Search Report and Written Opinion, PCT Application No. PCT/US2024/033136, Sep. 30, 2024, nine pages.

Badino, H. et al., "Visual Topometric Localization," IEEE Intelligent Vehicles Symposium, Jun. 5-9, 2011, pp. 794-799.

Martinez-Martin, E. et al., "The UJI Aerial Librarian Robot: A Quadcopter for Visual Library Inventory and Book Localisation," Sensors, Feb. 4, 2021, vol. 21, Issue 4, pp. 1-16.

Stanko, J. et al., "Towards Automatic Inventory Checking Using an Autonomous Unmanned Aerial Vehicle," 2022 IEEE 27th International Conference on Emerging Technologies and Factory Automation (ETFA), Sep. 6-9, 2022, pp. 1-8.

\* cited by examiner

TOPOMETRIC MAP BASED AUTONOMOUS NAVIGATION FOR INVENTORY DRONE

FIELD OF THE INVENTION

This disclosure relates generally to directing robots in a storage site, and more specifically using a topometric map for autonomous navigation for an inventory robot.

BACKGROUND

In recent years, applications for unmanned aerial vehicles (UAVs) have grown rapidly across numerous industries. Despite its high adoption rate, the navigation of UAVs is still a challenging task for various reasons. A main source of challenge for an autonomous device's operation is the mapping of the environment in which it operates. Generating and updating a map of the device's environment can be a costly exercise, with high computation and memory requirements. Accordingly, it is difficult to incorporate a map of high complexity into devices with limited storage and energy resources.

SUMMARY

Embodiments relate to a navigation system based on a topometric map, used for routing an inventory robot within a storage site. The method may include generating a topometric map using layout information of the storage site. The topometric map is represented with a collection of vertices and edges. The vertices represent locations in the storage site that the inventory robot can visit, such as pallet locations and other key locations, while edges connect neighboring vertices and form different paths that the robot can take. The method may further include using a topometric map to generate a path between two vertices and using a perception engine to update the topometric map as the inventory robot navigates through the storage site. The method may further include determining a sequence of actions performed by the inventory robot based in part on the generated path between two vertices.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a method for autonomously navigating an inventory robot in a storage site environment. A topometric map that includes vertices and edges may be generated using a layout of a storage site. Vertices may be generated at pallet locations and other structural locations. Edges are generated between neighboring vertices and represent traversable paths for the inventory robot. The robot may visit vertices to capture images of inventory or for navigation purposes. Vertices and edges may have associated metrics that can be updated while the robot navigates the storage site. Vertex and edge metrics can be used to calculate a cost for the robot to traverse each edge. The cost of each edge can be used to determine the shortest path from a source vertex to a destination vertex.

System Overview

Figure 1:
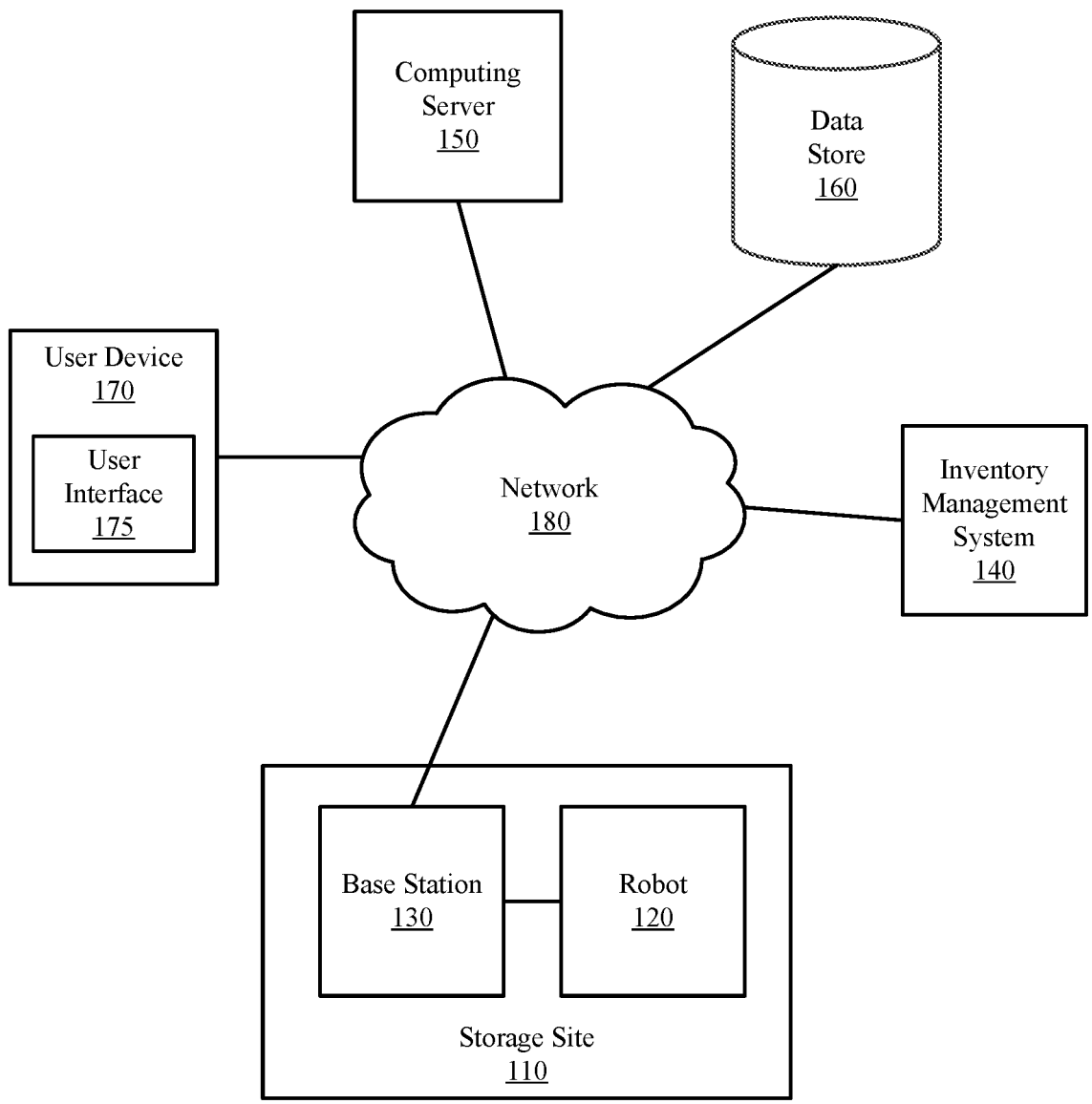
FIG. 1 is a block diagram that illustrates a system environment of an example storage site, according to an embodiment.

FIG. (FIG. 1 is a block diagram that illustrates a system environment 100 of an example robotically-assisted or fully autonomous storage site, according to an embodiment. By way of example, the system environment 100 includes a storage site 110, a robot 120, a base station 130, an inventory management system 140, a computing server 150, a data store 160, and a user device 170. The entities and components in the system environment 100 communicate with each other through the network 180. In various embodiments, the system environment 100 may include different, fewer, or additional components. Also, while each of the components in the system environment 100 is described in a singular form, the system environment 100 may include one or more of each of the components. For example, the storage site 110 may include one or more robots 120 and one or more base stations 130. Each robot 120 may have a corresponding base station 130 or multiple robots 120 may share a base station 130.

A storage site 110 may be any suitable facility that stores, sells, or displays inventories such as goods, merchandise, groceries, articles and collections. Example storage sites 110 may include warehouses, inventory sites, bookstores, shoe stores, outlets, other retail stores, libraries, museums, etc. A storage site 110 may include a number of regularly shaped structures. Regularly shaped structures may be structures, fixtures, equipment, furniture, frames, shells, racks, or other suitable things in the storage site 110 that have a regular shape or outline that can be readily identifiable, whether the things are permanent or temporary, fixed or movable, weight-bearing or not. The regularly shaped structures are often used in a storage site 110 for storage of inventory. For example, racks (including metallic racks, shells, frames, or other similar structures) are often used in a warehouse for the storage of goods and merchandise. However, not all regularly shaped structures may need to be used for inventory storage. A storage site 110 may include a certain layout that allows various items to be placed and stored systematically. For example, in a warehouse, the racks may be grouped by sections and separated by aisles. Each rack may include multiple pallet locations that can be identified using a row number and a column number. A storage site may include high racks and low racks, which may, in some case, largely carry most of the inventory items near the ground level.

A storage site 110 may include one or more robots 120 that are used to keep track of the inventory and to manage the inventory in the storage site 110. For the ease of reference, the robot 120 may be referred to in a singular form, even though more than one robot 120 may be used. Also, in some embodiments, there can be more than one type of robot 120 in a storage site 110. For example, some robots 120 may specialize in scanning inventory in the storage site 110, while other robots 120 may specialize in moving items. A robot 120 may also be referred to as an autonomous robot, an inventory cycle-counting robot, an inventory survey robot, an inventory detection robot, or an inventory management robot. An inventory robot may be used to track inventory items, move inventory items, and carry out other inventory management tasks. The degree of autonomy may vary from embodiments to embodiments. For example, in one embodiment, the robot 120 may be fully autonomous so that the robot 120 automatically performs assigned tasks. In another embodiment, the robot 120 may be semi-autonomous such that it can navigate through the storage site 110 with minimal human commands or controls. In some embodiments, no matter what the degree of autonomy it has, a robot 120 may also be controlled remotely and may be switched to a manual mode. The robot 120 may take various forms such as an aerial drone, a ground robot, a vehicle, a forklift, and a mobile picking robot.

A base station 130 may be a device for the robot 120 to return and, for an aerial robot, to land. The base station 130 may include more than one return site. The base station 130 may be used to repower the robot 120. Various ways to repower the robot 120 may be used in different embodiments. For example, in one embodiment, the base station 130 serves as a battery-swapping station that exchanges batteries on a robot 120 as the robot arrives at the base station to allow the robot 120 to quickly resume duty. The replaced batteries may be charged at the base station 130, wired or wirelessly. In another embodiment, the base station 130 serves as a charging station that has one or more charging terminals to be coupled to the charging terminal of the robot 120 to recharge the batteries of the robot 120. In yet another embodiment, the robot 120 may use fuel for power and the base station 130 may repower the robot 120 by filling its fuel tank.

The base station 130 may also serve as a communication station for the robot 120. For example, for certain types of storage sites 110 such as warehouses, network coverage may not be present or may only be present at certain locations. The base station 130 may communicate with other components in the system environment 100 using wireless or wired communication channels such as Wi-Fi or an Ethernet cable. The robot 120 may communicate with the base station 130 when the robot 120 returns to the base station 130. The base station 130 may send inputs such as commands to the robot 120 and download data captured by the robot 120. In embodiments where multiple robots 120 are used, the base station 130 may be equipped with a swarm control unit or algorithm to coordinate the movements among the robots. The base station 130 and the robot 120 may communicate in any suitable ways such as radio frequency, Bluetooth, near-field communication (NFC), or wired communication. While, in one embodiment, the robot 120 mainly communicates to the base station, in other embodiments the robot 120 may also have the capability to directly communicate with other components in the system environment 100. In one embodiment, the base station 130 may serve as a wireless signal amplifier for the robot 120 to directly communicate with the network 180.

The inventory management system 140 may be a computing system that is operated by the administrator (e.g., a company that owns the inventory, a warehouse management administrator, a retailer selling the inventory) using the storage site 110. The inventory management system 140 may be a system used to manage the inventory items. The inventory management system 140 may include a database that stores data regarding inventory items and the items' associated information, such as quantities in the storage site 110, metadata tags, asset type tags, barcode labels and location coordinates of the items. The inventory management system 140 may provide both front-end and back-end software for the administrator to access a central database and point of reference for the inventory and to analyze data, generate reports, forecast future demands, and manage the locations of the inventory items to ensure items are correctly placed. An administrator may rely on the item coordinate data in the inventory management system 140 to ensure that items are correctly placed in the storage site 110 so that the items can be readily retrieved from a storage location. This prevents an incorrectly placed item from occupying a space that is reserved for an incoming item and also reduces time to locate a missing item at an outbound process.

The computing server 150 may be a server that is tasked with analyzing data provided by the robot 120 and provide commands for the robot 120 to perform various inventory recognition and management tasks. The robot 120 may be controlled by the computing server 150, the user device 170, or the inventory management system 140. For example, the computing server 150 may direct the robot 120 to scan and capture pictures of inventory stored at various locations at the storage site 110. Based on the data provided by the inventory management system 140 and the ground truth data captured by the robot 120, the computing server 150 may identify discrepancies in two sets of data and determine whether any items may be misplaced, lost, damaged, or otherwise should be flagged for various reasons. In turn, the computing server 150 may direct a robot 120 to remedy any potential issues such as moving a misplaced item to the correct position. In one embodiment, the computing server 150 may also generate a report of flagged items to allow site personnel to manually correct the issues.

The computing server 150 may include one or more computing devices that operate at different locations. For example, a part of the computing server 150 may be a local server that is located at the storage site 110. The computing hardware such as the processor may be associated with a computer on site or may be included in the base station 130. Another part of the computing server 150 may be a cloud server that is geographically distributed. The computing server 150 may serve as a ground control station (GCS), provide data processing, and maintain end-user software that may be used in a user device 170. A GCS may be responsible for the control, monitor and maintenance of the robot 120. In one embodiment, GCS is located on-site as part of the base station 130. The data processing pipeline and end-user software server may be located remotely or on-site.

The computing server 150 may maintain software applications for users to manage the inventory, the base station 130, and the robot 120. The computing server 150 and the inventory management system 140 may or may not be operated by the same entity. In one embodiment, the computing server 150 may be operated by an entity separated from the administrator of the storage site. For example, the computing server 150 may be operated by a robotic service provider that supplies the robot 120 and related systems to modernize and automate a storage site 110. The software application provided by the computing server 150 may take several forms. In one embodiment, the software application may be integrated with or as an add-on to the inventory management system 140. In another embodiment, the software application may be a separate application that supplements or replaces the inventory management system 140. In one embodiment, the software application may be provided as software as a service (SaaS) to the administrator of the storage site 110 by the robotic service provider that supplies the robot 120.

The data store 160 includes one or more storage units such as memory that takes the form of non-transitory and non-volatile computer storage medium to store various data that may be uploaded by the robot 120 and inventory management system 140. For example, the data stored in data store 160 may include pictures, sensor data, and other data captured by the robot 120. The data may also include inventory data that is maintained by the inventory management system 140. The computer-readable storage medium is a medium that does not include a transitory medium such as a propagating signal or a carrier wave. The data store 160 may take various forms. In one embodiment, the data store 160 communicates with other components by the network 180. This type of data store 160 may be referred to as a cloud storage server. Example cloud storage service providers may include AWS, AZURE STORAGE, GOOGLE CLOUD STORAGE, etc. In another embodiment, instead of a cloud storage server, the data store 160 is a storage device that is controlled and connected to the computing server 150. For example, the data store 160 may take the form of memory (e.g., hard drives, flash memories, discs, ROMs, etc.) used by the computing server 150 such as storage devices in a storage server room that is operated by the computing server 150.

The user device 170 may be used by an administrator of the storage site 110 to provide commands to the robot 120 and to manage the inventory in the storage site 110. For example, using the user device 170, the administrator can provide task commands to the robot 120 for the robot to automatically complete the tasks. In one case, the administrator can specify a specific target location or a range of storage locations for the robot 120 to scan. The administrator may also specify a specific item for the robot 120 to locate or to confirm placement. Examples of user devices 170 include personal computers (PCs), desktop computers, laptop computers, tablet computers, smartphones, wearable electronic devices such as smartwatches, or any other suitable electronic devices.

The user device 170 may include a user interface 175, which may take the form of a graphical user interface (GUI). Software application provided by the computing server 150 or the inventory management system 140 may be displayed as the user interface 175. The user interface 175 may take different forms. In one embodiment, the user interface 175 is part of a front-end software application that includes a GUI displayed at the user device 170. In one case, the front-end software application is a software application that can be downloaded and installed at user devices 170 via, for example, an application store (e.g., App Store) of the user device 170. In another case, the user interface 175 takes the form of a Web interface of the computing server 150 or the inventory management system 140 that allows clients to perform actions through web browsers. In another embodiment, user interface 175 does not include graphical elements but communicates with the computing server 150 or the inventory management system 140 via other suitable ways such as command windows or application program interfaces (APIs).

The communications among the robot 120, the base station 130, the inventory management system 140, the computing server 150, the data store 160, and the user device 170 may be transmitted via a network 180, for example, via the Internet. In one embodiment, the network 180 uses standard communication technologies and/or protocols. Thus, the network 180 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express, etc. Similarly, the networking protocols used on the network 180 can include multiprotocol label switching (MPLS), the transmission control protocol/Internet protocol (TCP/IP), the user datagram protocol (UDP), the hypertext transport protocol (HTTP), the simple mail transfer protocol (SMTP), the file transfer protocol (FTP), etc. The data exchanged over the network 180 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet protocol security (IPsec), etc. The network 180 also includes links and packet switching networks such as the Internet. In some embodiments, two computing servers, such as computing server 150 and inventory management system 140, may communicate through APIs. For example, the computing server 150 may retrieve inventory data from the inventory management system 140 via an API.

Example Robot and Base Station

Figure 2:
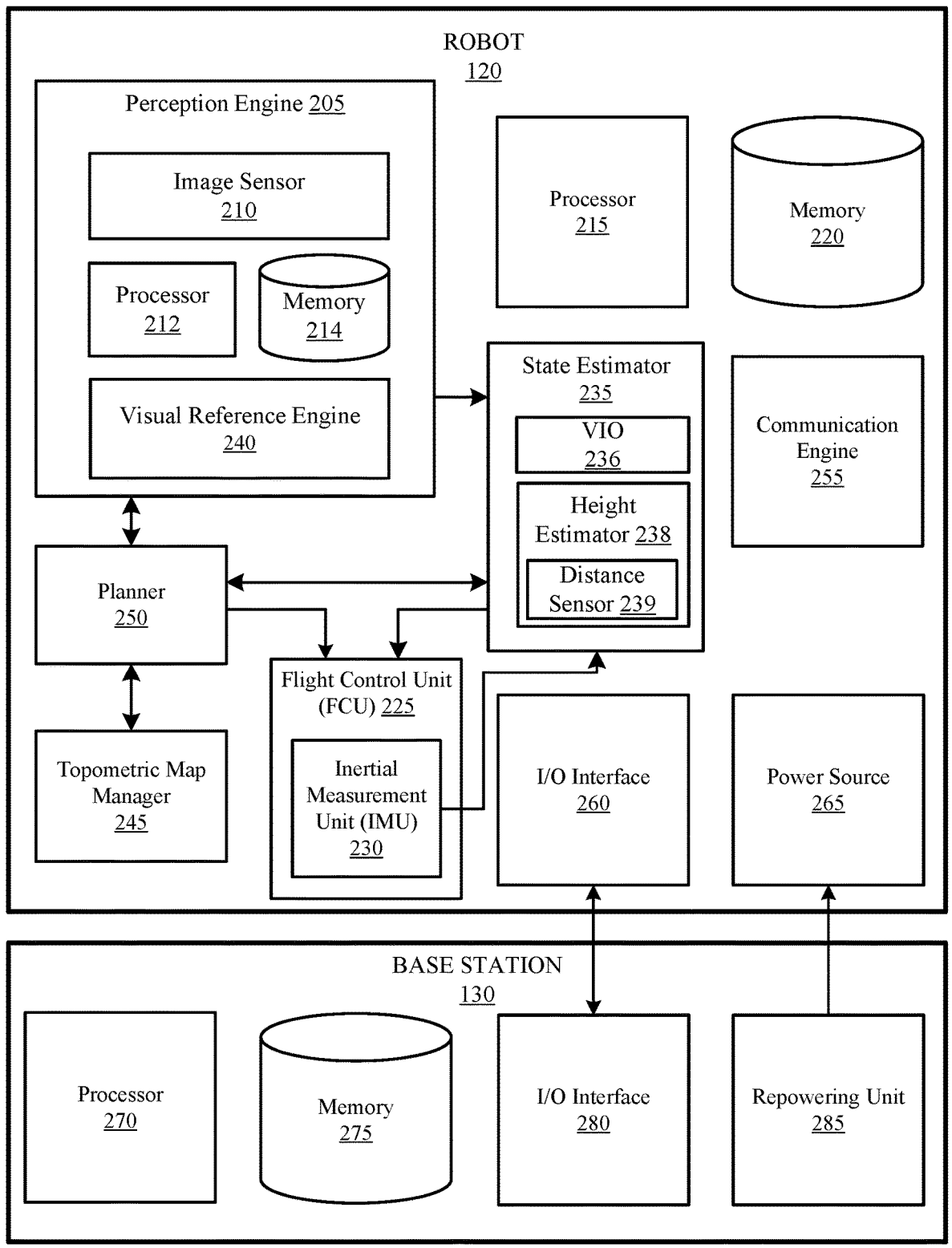
FIG. 2 is a block diagram that illustrates components of an example robot and an example base station, according to an embodiment.

FIG. 2 is a block diagram illustrating components of an example robot 120 and an example base station 130, according to an embodiment. The robot 120 may include a perception engine 205 that includes an image sensor 210 and a visual reference engine 240, a processor 215, memory 220, a flight control unit (FCU) 225 that includes an inertia measurement unit (IMU) 230, a state estimator 235, a topometric map manager 245, a planner 250, a communication engine 255, an I/O interface 260, and a power source 265. The functions of the robot 120 may be distributed among various components in a different manner than described below. In various embodiments, the robot 120 may include different, fewer, and/or additional components. Also, while each of the components in FIG. 2 is described in a singular form, the components may present in plurality. For example, a robot 120 may include more than one image sensor 210 and more than one processor 215.

The perception engine 205 may be a combination of software and hardware, which may include an image sensor 210, its own processor 212, and memory 214 that stores a set of instructions. In various embodiments, the perception engine 205 may include more than one image sensor 210, more than one processor 212 and more than one memory 214. The image sensor 210 may be configured to capture images of an environment of a storage site for navigation, localization, collision avoidance, object recognition and identification, and inventory recognition purposes. The perception engine may include more than one image sensors 210 and more than one type of such image sensors 210. For example, the perception engine 205 may include a digital camera that captures optical images of the environment for the state estimator 235. For example, data captured by the image sensor 210 may also be provided to the VIO unit 236 that may be included in the state estimator 235 for localization purposes such as to determine the position and orientation of the robot 120 with respect to an inertial frame, such as a global frame whose location is known and fixed. The perception engine 205 may also include a stereo camera that includes two or more lenses to allow the image sensor 210 to capture three-dimensional images through stereoscopic photography. For each image frame, the stereo camera may generate pixel values such as in red, green, and blue (RGB) and point cloud data that includes depth information. The images captured by the stereo camera may be provided to visual reference engine 240 for object recognition purposes. The image sensor 210 may also be another type of image sensor such as a light detection and ranging (LIDAR) sensor, an infrared camera, and 360-degree depth cameras. The image sensor 210 may also capture pictures of labels (e.g., barcodes) on items for inventory cycle-counting purposes. In some embodiments, a single stereo camera may be used for various purposes. For example, the stereo camera may provide image data to the visual reference engine 240 for object recognition. The stereo camera may also be used to capture pictures of labels (e.g., barcodes). In some embodiments, the robot 120 includes a rotational mount such as a gimbal that allows the image sensor 210 to rotate in different angles and to stabilize images captured by the image sensor 210. In one embodiment, the image sensor 210 may also capture data along the path for the purpose of mapping the storage site.

The visual reference engine 240 may correspond to a set of software instructions stored in the memory 214 that can be executed by the processor 212. The visual reference engine 240 may include various image processing algorithm and location algorithm to determine the current location of the robot 120, to identify the objects, edges, and surfaces of the environment near the robot 120, and to determine an estimated distance and orientation (e.g., yaw) of the robot 120 relative to a nearby surface of an object. The visual reference engine 240 may receive pixel data of a series of images and point cloud data from the image sensor 210. The location information generated by the visual reference engine 240 may include distance and yaw from an object and center offset from a target point (e.g., a midpoint of a target object).

The visual reference engine 240 may include one or more algorithms and machine learning models to create image segmentations from the images captured by the image sensor 210. The image segmentation may include one or more segments that separate the frames (e.g., vertical or horizontal bars of racks) or outlines of regularly shaped structures appearing in the captured images from other objects and environments. The algorithms used for image segmentation may include a convolutional neural network (CNN). In performing the segmentation, other image segmentation algorithms such as edge detection algorithms (e.g., Canny operator, Laplacian operator, Sobel operator, Prewitt operator), corner detection algorithms, Hough transform, and other suitable feature detection algorithms may also be used.

The visual reference engine 240 also performs object recognition (e.g., object detection and further analyses) and keeps track of the relative movements of the objects across a series of images. The visual reference engine 240 may track the number of regularly shaped structures in the storage site 110 that are passed by the robot 120. For example, the visual reference engine 240 may identify a reference point (e.g., centroid) of a frame of a rack and determine if the reference point passes a certain location of the images across a series of images (e.g., whether the reference point passes the center of the images). If so, the visual reference engine 240 increments the number of regularly shaped structures that have been passed by the robot 120.

The processor 212 may be configured to execute a set of instructions stored in memory 214. The set of instructions, when executed by the processor 212, may cause the processor 212 to carry out processes that instruct the image sensor 210 to capture images of an environment of a storage site, and instruct the visual reference engine 240 to process the captured image data. The memory 214 may also store images and videos captured by the image sensor 210. The perception engine 205 may communicate with the visual reference engine 240 and the state estimator 235 for purposes of navigation, localization, object recognition, collision avoidance, and identification and inventory recognition. For example, the perception engine 205 may take images to measure structural components of the regularly shaped structures found in the storage site. The perception engine 205 receives instructions from the planner 250 to detect a known structure or structural component, such as a rack, a horizontal beam, or an upright beam of a rack. In response, the processor 212 instructs the image sensor 210 to take images of the target structure or structural component, and the data captured by the image sensor 210 is provided to the visual reference engine 240. The visual reference engine 240 may perform various image processing algorithms to identify the structural component in the environment near the robot 120, The state estimator 235 may determine the position and orientation of the robot 120 with respect to an inertial frame, such as a global frame whose location is known and fixed. The captured data is used to measure the structural component and calculate the relative pose of the robot with respect to the structure. Details of how the perception engine 205 may be used by the robot 120 to navigate the storage facility and manage inventory are discussed in FIG. 7 through FIG. 9.

The robot 120 includes one or more processors 215 and one or more memories 220 that store one or more sets of instructions. The one or more sets of instructions, when executed by one or more processors, cause the one or more processors to carry out processes that are implemented as one or more software engines. Various components, such as FCU 225 and state estimator 235, of the robot 120 may be implemented as a combination of software and hardware (e.g., sensors). The robot 120 may use a single general processor to execute various software engines or may use separate more specialized processors for different functionalities. In one embodiment, the robot 120 may use a general-purpose computer (e.g., a CPU) that can execute various instruction sets for various components (e.g., FCU 225, visual reference engine 240, state estimator 235, planner 250). The general-purpose computer may run on a suitable operating system such as LINUX, ANDROID, etc. For example, in one embodiment, the robot 120 may carry a smartphone that includes an application used to control the robot. In another embodiment, the robot 120 includes multiple processors that are specialized in different functionalities. For example, some of the functional components such as FCU 225, state estimator 235, and planner 250 may be modularized and each includes its own processor, memory, and a set of instructions. The robot 120 may include a central processor unit (CPU) to coordinate and communicate with each modularized component. Hence, depending on embodiments, a robot 120 may include a single processor or multiple processors 215 to carry out various operations. The memory 220 may also store images and videos captured by the image sensor 210 from the perception engine 205. The images may include images that capture the surrounding environment and images of the inventory such as barcodes and labels.

The flight control unit (FCU) 225 may be a combination of software and hardware, such as inertial measurement unit (IMU) 230 and other sensors, to control the movement of the robot 120. For ground robot 120, the flight control unit 225 may also be referred to as a microcontroller unit (MCU). The FCU 225 relies on information provided by other components to control the movement of the robot 120. For example, the planner 250 determines the path of the robot 120 from a starting point to a destination and provides commands to the FCU 225. Based on the commands, the FCU 225 generates electrical signals to various mechanical parts (e.g., actuators, motors, engines, wheels) of the robot 120 to adjust the movement of the robot 120. The precise mechanical parts of the robots 120 may depend on the embodiments and the types of robots 120.

The IMU 230 may be part of the FCU 225 or may be an independent component. The IMU 230 may include one or more accelerometers, gyroscopes, and other suitable sensors to generate measurements of forces, linear accelerations, and rotations of the robot 120. For example, the accelerometers measure the force exerted on the robot 120 and detect the linear acceleration. Multiple accelerometers cooperate to detect the acceleration of the robot 120 in the three-dimensional space. For instance, a first accelerometer detects the acceleration in the x-direction, a second accelerometer detects the acceleration in the y-direction, and a third accelerometer detects the acceleration in the z-direction. The gyroscopes detect the rotations and angular velocity of the robot 120. Based on the measurements, a processor 215 may obtain the estimated localization of the robot 120 by integrating the translation and rotation data of the IMU 230 with respect to time. The IMU 230 may also measure the orientation of the robot 120. For example, the gyroscopes in the IMU 230 may provide readings of the pitch angle, the roll angle, and the yaw angle of the robot 120.

The state estimator 235 may correspond to a set of software instructions stored in the memory 220 that can be executed by the processor 215. The state estimator 235 may be used to generate localization information of the robot 120 and may include various sub-components for estimating the state of the robot 120. For example, in one embodiment, the state estimator 235 may include a visual-inertial odometry (VIO) unit 236 and a height estimator 238. In other embodiments, other modules, sensors, and algorithms may also be used in the state estimator 235 to determine the location of the robot 120.

The VIO unit 236 receives image data from the image sensor 210 (e.g., a stereo camera) and measurements from IMU 230 to generate localization information such as the position and orientation of the robot 120. The localization data obtained from the double integration of the acceleration measurements from the IMU 230 is often prone to drift errors. The VIO unit 236 may extract image feature points and tracks the feature points in the image sequence to generate optical flow vectors that represent the movement of edges, boundaries, surfaces of objects in the environment captured by the image sensor 210. Various signal processing techniques such as filtering (e.g., Wiener filter, Kalman filter, bandpass filter, particle filter) and optimization, and data/image transformation may be used to reduce various errors in determining localization information. The localization data generated by the VIO unit 236 may include an estimate of the pose of the robot 120, which may be expressed in terms of the 3D position (x,y,z), the roll angle, the pitch angle, and the yaw angle of the robot 120.

The height estimator 238 may be a combination of software and hardware that are used to determine the absolute height and relative height (e.g., distance from an object that lies on the floor) of the robot 120. The height estimator 238 may include a downward distance sensor 239 that may measure the height relative to the ground or to an object underneath the robot 120. The distance sensor 239 may be electromagnetic wave based, laser based, optics based, sonar based, ultrasonic based, or another suitable signal based. For example, the distance sensor 239 may be a laser range finder, a lidar range finder, a sonar range finder, an ultrasonic range finder, or a radar. A range finder may include one or more emitters that emit signals (e.g., infrared, laser, sonar, etc.) and one or more sensors that detect the round trip time of the signal reflected by an object. In some embodiments, the robot 120 may be equipped with a single emitter range finder. The height estimator 238 may also receive data from the VIO unit 236 that may estimate the height of the robot 120, but usually in a less accurate fashion compared to a distance sensor 239. The height estimator 238 may include software algorithms to combine data generated by the distance sensor 239 and the data generated by the VIO unit 236 as the robot 120 flies over various objects and inventory that are placed on the floor or other horizontal levels. The data generated by the height estimator 238 may be used for collision avoidance and finding a target location. The height estimator 238 may set a global maximum altitude to prevent the robot 120 from hitting the ceiling. The height estimator 238 also provides information regarding how many rows in the rack are below the robot 120 for the robot 120 to locate a target location. The height data may be used in conjunction with the count of rows that the robot 120 has passed to determine the vertical level of the robot 120.

The robot 120 may use various components to generate various types of location information (including location information relative to nearby objects and localization information). For example, in one embodiment, the state estimator 235 may process the data from the VIO unit 236 and the height estimator 238 to provide localization information to the planner 250. The visual reference engine 240 may count the number of regularly shaped structures that the robot 120 has passed to determine a current location. The visual reference engine 240 may generate location information relative to nearby objects. For example, when the robot 120 reaches a target location of a rack, the visual reference engine 240 may use point cloud data to reconstruct a surface of the rack and use the depth data from the point cloud to determine more accurate yaw and distance between the robot 120 and the rack. The visual reference engine 240 may determine a center offset, which may correspond to the distance between the robot 120 and the center of a target location (e.g., the midpoint of a target location of a rack). Using the center offset information, the planner 250 controls the robot 120 to move to the target location and take a picture of the inventory in the target location. When the robot 120 changes direction (e.g., rotations, transitions from horizontal movement to vertical movement, transitions from vertical movement to horizontal movement, etc.), the center offset information may be used to determine the accurate location of the robot 120 relative to an object.

The topometric map manager 245 may correspond to a set of software instructions stored in the memory 220 that can be executed by the processor 215. The topometric map manager 245 may include algorithm that generate and manage one or more topometric maps stored in the memory 220. A topometric map may correspond to the topology of the storage site 110 and may include metrics that measure precise dimensions of different components in the topology. The topometric map manager 245 may download an initial version of the topometric map that is provided by computing server 150 and direct the robot 120 to survey the storage site 110 to measure or verify the metric values at various locations of the storage site 110. Details of example topometric maps and how the maps may be used to route the robot 120 are discussed in FIG. 5 through FIG. 10.

The planner 250 may correspond to a set of software instructions stored in the memory 220 that can be executed by the processor 215. The planner 250 may request the Topometric Map Manager 245 which includes various routing algorithms to plan a path of the robot 120 as the robot travels from a first location (e.g., a starting location, the current location of the robot 120 after finishing the previous journey) to a second location (e.g., a target destination). The robot 120 may receive inputs such as user commands to perform certain actions (e.g., scanning of inventory, moving an item, etc.) at certain locations. The planner 250 may include two types of routes, which corresponds to a spot check and a range scan. In a spot check, the planner 250 may receive an input that includes coordinates of one or more specific target locations. In response, the planner 250 plans a path for the robot 120 to travel to the target locations to perform an action. In a range scan, the input may include a range of coordinates corresponding to a range of target locations. In response, the planner 250 plans a path for the robot 120 to perform a full scan or actions for the range of target locations. Whether the robot 120 is performing a spot check or a range scan, the planner 250 may use a topometric map to determine the path to complete the action.

The planner 250 may plan the route of the robot 120 based on data provided by the visual reference engine 240 and the data provided by the state estimator 235. For example, the visual reference engine 240 estimates the current location of the robot 120 by tracking the number of regularly shaped structures in the storage site 110 passed by the robot 120. Based on the location information provided by the visual reference engine 240, the planner 250 determines the route of the robot 120 and may adjust the movement of the robot 120 as the robot 120 travels along the route.

The planner 250 may also include a fail-safe mechanism in the case where the movement of the robot 120 has deviated from the plan. For example, if the planner 250 determines that the robot 120 has passed a target aisle and traveled too far away from the target aisle, the planner 250 may send signals to the FCU 225 to try to remedy the path. If the error is not remedied after a timeout or within a reasonable distance, or the planner 250 is unable to correctly determine the current location, the planner 250 may direct the FCU to land or to stop the robot 120.

Relying on various location information, the planner 250 may also include algorithms for collision avoidance purposes. In one embodiment, the planner 250 relies on the distance information, the yaw angle, and center offset information relative to nearby objects to plan the movement of the robot 120 to provide sufficient clearance between the robot 120 and nearby objects. Alternatively, or additionally, the robot 120 may include one or more depth cameras such as a 360-degree depth camera set that generates distance data between the robot 120 and nearby objects. The planner 250 uses the location information from the depth cameras to perform collision avoidance.

The communication engine 255 and the I/O interface 260 are communication components to allow the robot 120 to communicate with other components in the system environment 100. A robot 120 may use different communication protocols, wireless or wired, to communicate with an external component such as the base station 130. Example communication protocols may include Wi-Fi, Bluetooth, NFC, USB, etc. that couple the robot 120 to the base station 130. The robot 120 may transmit various types of data, such as image data, flight logs, location data, inventory data, and robot status information. The robot 120 may also receive inputs from an external source to specify the actions that need to be performed by the robot 120. The commands may be automatically generated or manually generated by an administrator. The communication engine 255 may include algorithms for various communication protocols and standards, encoding, decoding, multiplexing, traffic control, data encryption, etc. for various communication processes. The I/O interface 260 may include software and hardware component such as hardware interface, antenna, and so forth for communication.

The robot 120 also includes a power source 265 used to power various components and the movement of the robot 120. The power source 265 may be one or more batteries or a fuel tank. Example batteries may include lithium-ion batteries, lithium polymer (LiPo) batteries, fuel cells, and other suitable battery types. The batteries may be placed inside permanently or may be easily replaced. For example, batteries may be detachable so that the batteries may be swapped when the robot 120 returns to the base station 130.

While FIG. 2 illustrates various example components, a robot 120 may include additional components. For example, some mechanical features and components of the robot 120 are not shown in FIG. 2. Depending on its type, the robot 120 may include various types of motors, actuators, robotic arms, lifts, other movable components, other sensors for performing various tasks.

Continuing to refer to FIG. 2, an example base station 130 includes a processor 270, a memory 275, an I/O interface 280, and a repowering unit 285. In various embodiments, the base station 130 may include different, fewer, and/or additional components.

The base station 130 includes one or more processors 270 and one or more memories 275 that include one or more set of instructions for causing the processors 270 to carry out various processes that are implemented as one or more software modules. The base station 130 may provide inputs and commands to the robot 120 for performing various inventory management tasks. The base station 130 may also include an instruction set for performing swarm control among multiple robots 120. Swarm control may include task allocation, routing and planning, coordination of movements among the robots to avoid collisions, etc. The base station 130 may serve as a central control unit to coordinate the robots 120. The memory 275 may also include various sets of instructions for performing analysis of data and images downloaded from a robot 120. The base station 130 may provide various degrees of data processing from raw data format conversion to a full data processing that generates useful information for inventory management. Alternatively, or additionally, the base station 130 may directly upload the data downloaded from the robot 120 to a data store, such as the data store 160. The base station 130 may also provide operation, administration, and management commands to the robot 120. In one embodiment, the base station 130 can be controlled remotely by the user device 170, the computing server 150, or the inventory management system 140.

The base station 130 may also include various types of I/O interfaces 280 for communications with the robot 120 and to the Internet. The base station 130 may communicate with the robot 120 continuously using a wireless protocol such as Wi-Fi or Bluetooth. In one embodiment, one or more components of the robot 120 in FIG. 2 may be located in the base station and the base station may provide commands to the robot 120 for movement and navigation. Alternatively, or additionally, the base station 130 may also communicate with the robot 120 via short-range communication protocols such as NFC or wired connections when the robot 120 lands or stops at the base station 130. The base station 130 may be connected to the network 180 such as the Internet. The wireless network (e.g., LAN) in some storage sites 110 may not have sufficient coverage. The base station 130 may be connected to the network 180 via an Ethernet cable.

The repowering unit 285 includes components that are used to detect the power level of the robot 120 and to repower the robot 120. Repowering may be done by swapping the batteries, recharging the batteries, re-filling the fuel tank, etc. In one embodiment, the base station 130 includes mechanical actuators such as robotic arms to swap the batteries on the robot 120. In another embodiment, the base station 130 may serve as the charging station for the robot 120 through wired charging or inductive charging. For example, the base station 130 may include a landing or resting pad that has an inductive coil underneath for wirelessly charging the robot 120 through the inductive coil in the robot. Other suitable ways to repower the robot 120 is also possible.

Example Inventory Management Process

Figure 3:
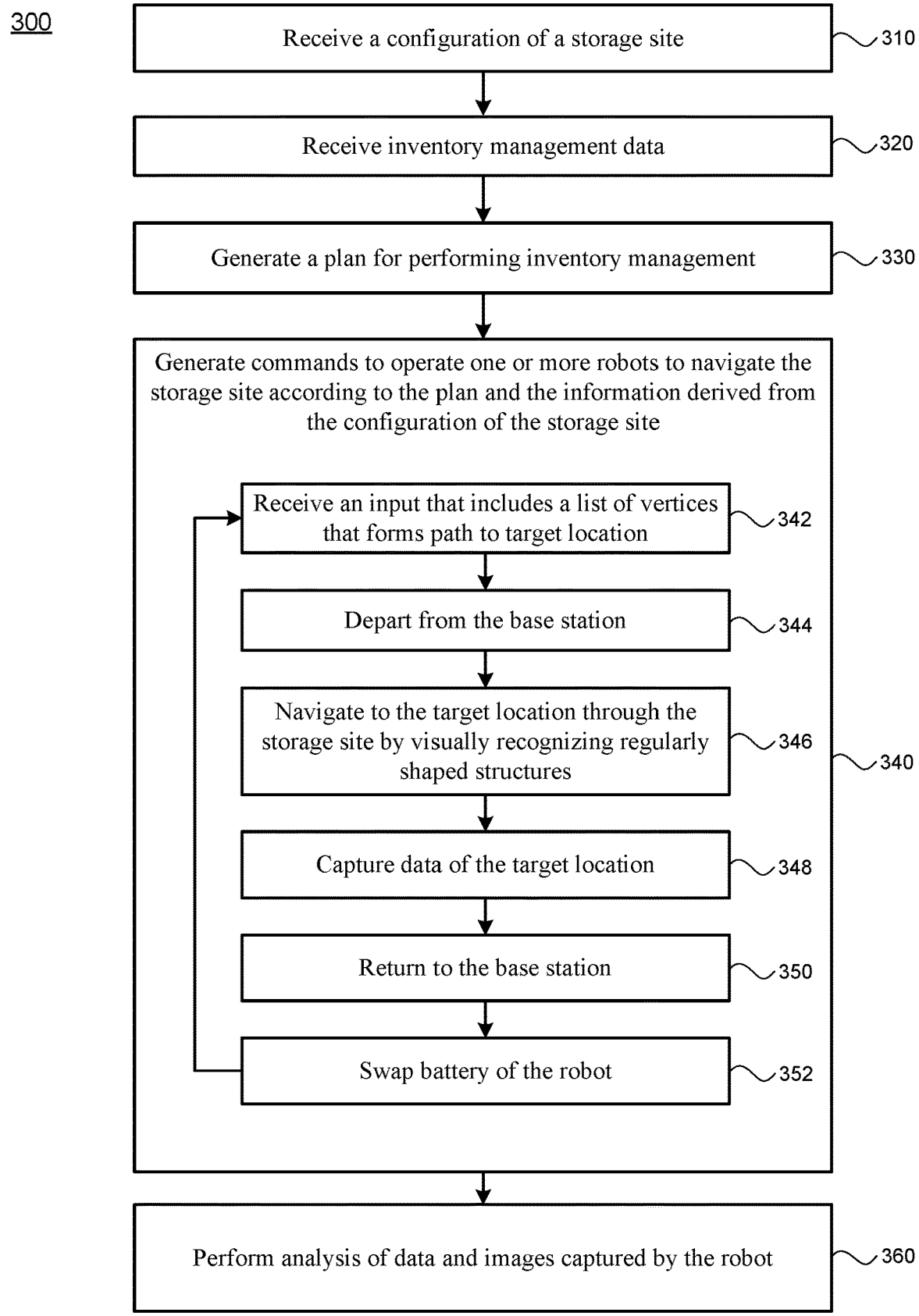
FIG. 3 is a flowchart that depicts an example process for managing the inventory of a storage site, according to an embodiment.

FIG. 3 is a flowchart that depicts an example process for managing the inventory of a storage site, according to an embodiment. The process may be implemented by a computer, which may be a single operation unit in a conventional sense (e.g., a single personal computer) or may be a set of distributed computing devices that cooperate to execute a set of instructions (e.g., a virtual machine, a distributed computing system, cloud computing, etc.). Also, while the computer is described in a singular form, the computer that performs the process in FIG. 3 may include more than one computer that is associated with the computing server 150, the inventory management system 140, the robot 120, the base station 130, or the user device 170.

According to an embodiment, the computer receives 310 a configuration of a storage site 110. The storage site 110 may be a warehouse, a retail store, or another suitable site. The configuration information of the storage site 110 may be uploaded to the robot 120 for the robot to navigate through the storage site 110. The configuration information may include a total number of the regularly shaped structures in the storage site 110 and dimension information of the regularly shaped structures. The configuration information provided may take the form of a computer-aided design (CAD) drawing or another type of file format. The configuration may include the layout of the storage site 110, such as the rack layout and placement of other regularly shaped structures. The layout may be a 2-dimensional layout. The computer extracts the number of sections, aisles, and racks and the number of rows and columns for each rack from the CAD drawing by counting those numbers as appeared in the CAD drawing. The computer may also extract the height and the width of the cells of the racks from the CAD drawing or from another source. In one embodiment, the computer does not need to extract the accurate distances between a given pair of racks, the width of each aisle, or the total length of the racks. Instead, the robot 120 may measure dimensions of aisles, racks, and cells from a depth sensor data or may use a counting method performed by the planner 250 in conjunction with the visual reference engine 240 to navigate through the storage site 110 by counting the number of rows and columns the robot 120 has passed. Hence, in some embodiments, the accurate dimensions of the racks may not be needed.

Some configuration information may also be manually inputted by an administrator of the storage site 110. For example, the administrator may provide the number of sections, the number of aisles and racks in each section, and the size of the cells of the racks. The administrator may also input the number of rows and columns of each rack.

Alternatively, or additionally, the configuration information may also be obtained through a mapping process such as a pre-flight mapping or a mapping process that is conducted as the robot 120 carries out an inventory management task. For example, for a storage site 110 that newly implements the automated management process, an administrator may provide the size of the navigable space of the storage site for one or more mapping robots to count the numbers of sections, aisles, rows and columns of the regularly shaped structures in the storage site 110. Again, in one embodiment, the mapping or the configuration information does not need to measure the accurate distance among racks or other structures in the storage site 110. Instead, a robot 120 may navigate through the storage site 110 with only a rough layout of the storage site 110 by counting the regularly shaped structures along the path in order to identify a target location. The robotic system may gradually perform mapping or estimation of scales of various structures and locations as the robot 120 continues to perform various inventory management tasks.

The computer receives 320 inventory management data for inventory management operations at the storage site 110. Certain inventory management data may be manually inputted by an administrator while other data may be downloaded from the inventory management system 140. The inventory management data may include scheduling and planning for inventory management operations, including the frequency of the operations, time window, etc. For example, the management data may specify that each location of the racks in the storage site 110 is to be scanned every predetermined period (e.g., every day) and the inventory scanning process is to be performed in the evening by the robot 120 after the storage site is closed. The data in the inventory management system 140 may provide the barcodes and labels of items, the correct coordinates of the inventory, information regarding racks and other storage spaces that need to be vacant for incoming inventory, etc. The inventory management data may also include items that need to be retrieved from the storage site 110 (e.g., items on purchase orders that need to be shipped) for each day so that the robot 120 may need to focus on those items.

The computer generates 330 a plan for performing inventory management. For example, the computer may generate an automatic plan that includes various commands to direct the robot 120 to perform various scans. The commands may specify a range of locations that the robot 120 needs to scan or one or more specific locations that the robot 120 needs to go. The computer may estimate the time for each scanning trip and design the plan for each operation interval based on the available time for the robotic inventory management. For example, in certain storage sites 110, robotic inventory management is not performed during the business hours.

The computer generates 340 various commands to operate one or more robots 120 to navigate the storage site 110 according to the plan and the information derived from the configuration of the storage site 110. The robot 120 may navigate the storage site 110 by at least visually recognizing the regularly shaped structures in the storage sites and counting the number of regularly shaped structures. In one embodiment, in addition to the localization techniques such as VIO used, the robot 120 counts the number of racks, the number of rows, and the number of columns that it has passed to determine its current location along a path from a starting location to a target location without knowing the accurate distance and direction that it has traveled.

The scanning of inventory or other inventory management tasks may be performed autonomously by the robot 120. In one embodiment, a scanning task begins at a base station at which the robot 120 receives 342 an input that includes coordinates of target locations in the storage site 110 or a range of target locations. The robot 120 departs 344 from the base station 130. The robot 120 navigates 346 through the storage site 110 by visually recognizing regularly shaped structures. For example, the robot 120 tracks the number of regularly shaped structures that are passed by the robot 120. The robot 120 makes turns and translation movements based on the recognized regularly shaped structures captured by the robot's image sensor 210. Upon reaching the target location, the robot 120 may align itself with a reference point (e.g., the center location) of the target location. At the target location, the robot 120 captures 348 data (e.g., measurements, pictures, etc.) of the target location that may include the inventory item, barcodes, and labels on the boxes of the inventory item. If the initial command before the departure of the robot 120 includes multiple target locations or a range of target locations, the robot 120 continues to the next target locations by moving up, down, or sideways to the next location to continue to scanning operation.

Upon completion of a scanning trip, the robot 120 returns to the base station 130 by counting the number of regularly shaped structures that the robot 120 has passed, in a reversed direction. The robot 120 may potentially recognize the structures that the robot has passed when the robot 120 travels to the target location. Alternatively, the robot 120 may also return to the base station 130 by reversing the path without any count. The base station 130 repowers the robot 120. For example, the base station 130 provides the next commands for the robot 120 and swaps 352 the battery of the robot 120 so that the robot 120 can quickly return to service for another scanning trip. The used batteries may be charged at the base station 130. The base station 130 also may download the data and images captured by the robot 120 and upload the data and images to the data store 160 for further process. Alternatively, the robot 120 may include a wireless communication component to send its data and images to the base station 130 or directly to the network 180.

The computer performs 360 analyses of the data and images captured by the robot 120. For example, the computer may compare the barcodes (including serial numbers) in the images captured by the robot 120 to the data stored in the inventory management system 140 to identify if any items are misplaced or missing in the storage site 110. The computer may also determine other conditions of the inventory. The computer may generate a report to display at the user interface 175 for the administrator to take remedial actions for misplaced or missing inventory. For example, the report may be generated daily for the personnel in the storage site 110 to manually locate and move the misplaced items. Alternatively, or additionally, the computer may generate an automated plan for the robot 120 to move the misplaced inventory. The data and images captured by the robot 120 may also be used to confirm the removal or arrival of inventory items.

Figure 4:
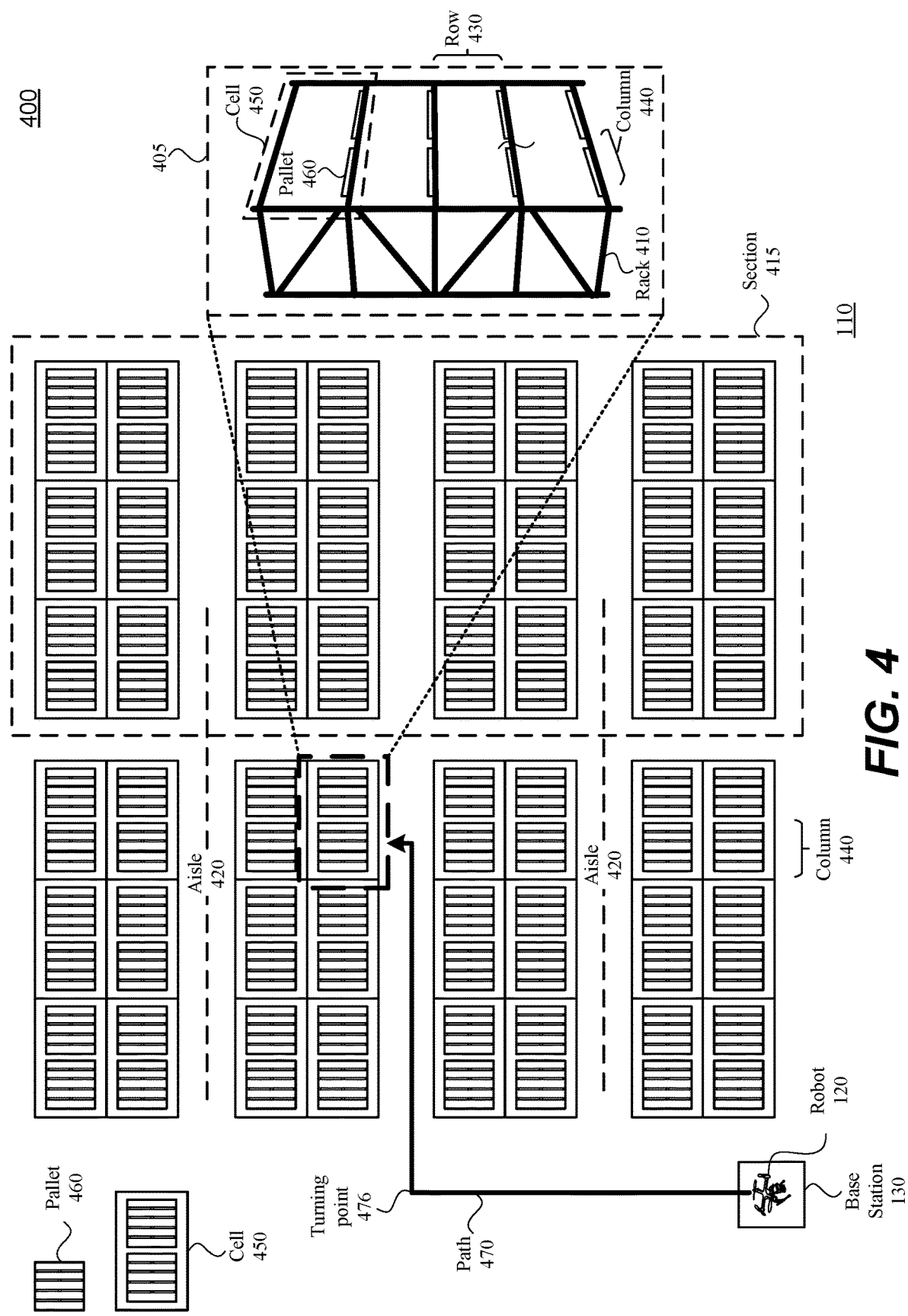
FIG. 4 is a conceptual diagram of an example layout of a storage site that is equipped with a robot, according to an embodiment.

FIG. 4 is a conceptual diagram of an example layout of a storage site 110 that is equipped with a robot 120, according to an embodiment. FIG. 4 shows a two-dimensional layout of storage site 110 with an enlarged view of an example rack that is shown in inset 405. The storage site 110 may be divided into different regions based on the regularly shaped structures. In this example, the regularly shaped structures are racks 410. The storage site 110 may be divided by sections 415, aisles 420, rows 430 and columns 440. For example, a section 415 is a group of racks. Each aisle may have two sides of racks. Each rack 410 may include one or more columns 440 and multiple rows 430. The storage unit of a rack 410 may be referred to as a cell 450. Each cell 450 may carry one or more pallets 460. In this particular example, two pallets 460 are placed on each cell 450. Inventory of the storage site 110 is carried on the pallets 460. The divisions and nomenclature illustrated in FIG. 4 are used as examples only. A storage site 110 in another embodiment may be divided in a different manner.

Each inventory item in the storage site 110 may be located on a pallet 460. The target location (e.g., a pallet location) of the inventory item may be identified using a coordinate system. For example, an item placed on a pallet 460 may have an aisle number (A), a rack number (K), a row number (R), and a column number (C). For example, a pallet location coordinate of [A3, K1, R4, and C5] means that the pallet 460 is located at a rack 410 in the third aisle and the north rack. The location of the pallet 460 in the rack 410 is in the fourth row (counting from the ground) and the fifth column. In some cases, such as the particular layout shown in FIG. 4, an aisle 420 may include racks 410 on both sides. Additional coordinate information may be used to distinguish the racks 410 at the north side and the racks 410 at the south side of an aisle 420. Alternatively, the top and bottom sides of the racks can have different aisle numbers. For a spot check, a robot 120 may be provided with a single coordinate if only one spot is provided or multiple coordinates if more than one spot is provided. For a range scan that checks a range of pallets 460, the robot 120 may be provided with a range of coordinates, such as an aisle number, a rack number, a starting row, a starting column, an ending row, and an ending column. In some embodiments, the coordinate of a pallet location may also be referred in a different manner. For example, in one case, the coordinate system may take the form of "aisle-rack-shelf-position." The shelf number may correspond to the row number and the position number may correspond to the column number.

Example Topometric Map Based Navigation System

Figure 5:
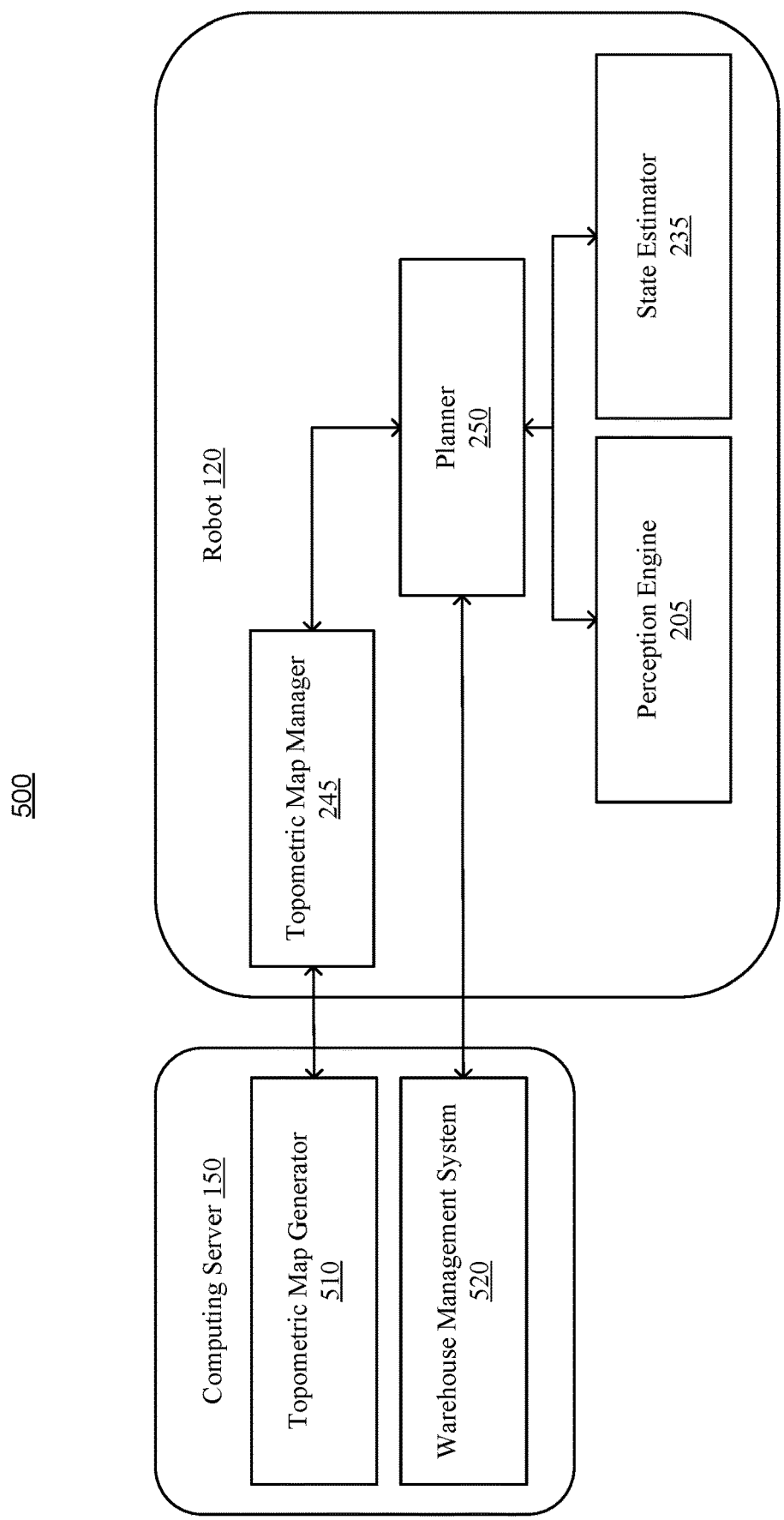
FIG. 5 is a block diagram illustrating components of an example topometric map-based navigation system for an inventory robot, according to an embodiment.

FIG. 5 is a block diagram illustrating components of an example topometric map-based navigation system for an inventory robot, according to an embodiment. The topometric map-based navigation system may include a computing server 150 and a robot 120 in communication with each other. The computing server 150 may include a topometric map generator 510 and a warehouse management system 520. The robot 120 may include a topometric map manager 245, a planner 250, a perception engine 205, a state estimator 235, and other components that are discussed in FIG. 2 but are not shown in FIG. 5. The navigation system may have alternative configurations than shown in FIG. 5, including different, fewer, or additional components. While, in some embodiments, the components are distributed between the computing server 150 and the robot 120 in the manner shown in FIG. 5, in other embodiments the components may be distributed differently. For example, in some embodiments, the topometric map manager 245 may reside in the computing server 150.

In various embodiments, the topometric map generator 510, warehouse management system 520, topometric map manager 245 and planner 250 may be software modules (e.g., code stored on a machine-readable medium). Other components of the robot 120, such as the perception engine 205 and state estimator 235, may implemented as a combination of hardware (e.g., sensors) and software. The warehouse management system 520 may be a computing system that is operated by an administrator (e.g., a company that owns the inventory, a warehouse management administrator, a retailer selling the inventory) using the storage site 110. The inventory management system 140 may be a system used to request the robot 120 to visit specific pallet locations to take images of target pallets.

The topometric map generator 510 may correspond to a set of software instructions stored in the computing server 150 that can be executed by a processor. The topometric map generator 510 may create a topometric map using layout information of a storage site, such as number of racks, and number of columns and rows of a rack. The topometric map may be represented by a graph that includes vertices and edges. A vertex may represent a pallet location or other structural locations. Some examples of structural locations include, and is not limited to, a location of a base station, a hovering location above the base station, entrances of aisles, destinated turning points, locations of freestanding pallets, sides of racks, frames of racks, and other identifiable locations related to structures or objects, whether the structures or objects are permanent or temporary, regular or irregular, large or small. Each vertex may include a unique label that is a combination of characteristics of the location of the vertex. Each vertex may be associated to one or more metrics that indicate the location of the vertex according to a coordinate system. Edges are generated between neighboring vertices and may be associated with one or more metrics that define the movement of the robot 120 while traversing the edge. A cost may be calculated for every edge in the topometric map, based on the one or more metrics. Edges may represent traversable paths in the storage site. Whether two vertices are connected through an edge may depend on the survey of the storage site (e.g., by the robot 120) or based on the original layout of the storage site 110. For example, if two vertices are separated by an obstacle (e.g., a wall, a rack, a pile of inventory), the two vertices may not be connected through an edge. In some embodiments, the edges may be dynamically adjusted to reflect the situation of the storage site to account for situations such as a temporary blockage of a path. While edges are oftentimes straight paths between two vertices, one or more edges may also represent other shapes of paths. Vertex and edge generation will be discussed in further detail in reference to FIG. 6A through FIG. 6B.

The topometric map generator 510 communicatively interfaces with the robot 120 through a network 180. The topometric map generator 510 generates a topometric map of a storage site and delivers the topometric map to the topometric map manager 245 in the robot 120, over the network 180. The topometric map manager 245 may communicate with the planner 250 to update the metrics of vertices and edges of the topometric map as the robot moves around the storage site. The planner 250 may communicate with the perception engine 205 and state estimator 235 to measure structural features of regularly shaped structures (e.g., beam length and beam span). The planner 250 uses the measurements to update vertex and edge metrics and instructs the topometric map manager 245 to update the topometric map. The vertex and edge metric update process will be discussed in further detail with reference to FIG. 9.

The topometric map manager 245 may generate the path between two vertices. The path may include a vertex list, which include vertex and edge metrics along the path, and is delivered to the planner 250. The planner 250 may determine the inventory robot's next behavior based in part on the shortest path provided by the topometric map manager 245. Examples of behaviors the robot may perform include, and is not limited to, takeoff, moving to the nearest rack, moving to the next rack, and entering an aisle. An example of the precise planning and the action taken by a robot 120 will be discussed in further detail with reference to FIG. 8.

Figure 6A:
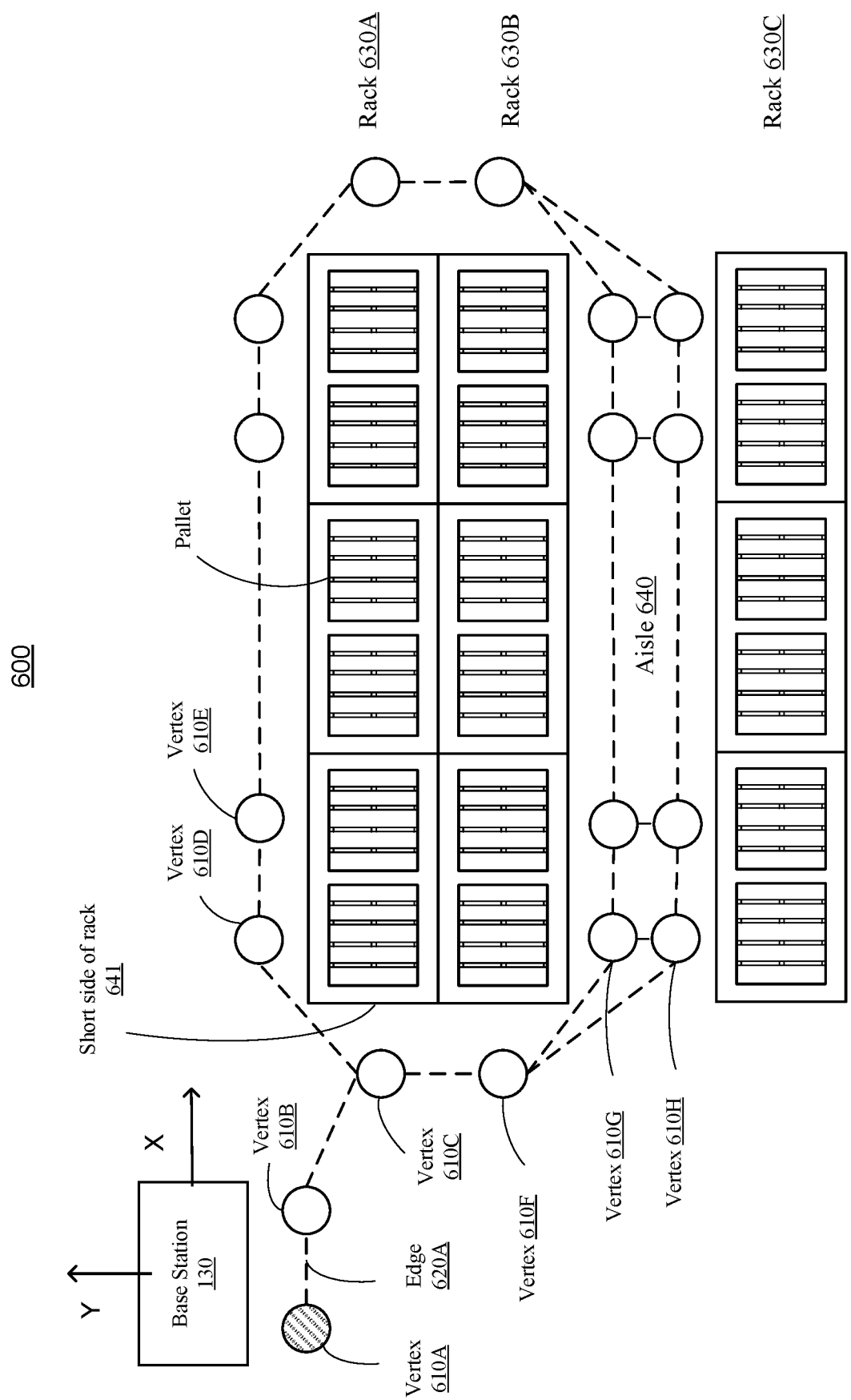
FIG. 6A is a conceptual diagram that illustrates an example visualization of a generated topometric map for a section of a storage facility from a top view, according to an embodiment.

FIG. 6A is a conceptual diagram that illustrates an example visualization of a topometric map for a section of a storage site 110 from a top view, according to an embodiment. Vertices may be generated based on the storage site's layout information, which may be received from the inventory management system 140. Illustrated in this example, vertices are generated at pallet locations and other structural locations that may aid the navigation of the robot. Some examples of structural locations include, and are not limited to, the base station 130, a hovering location above the base station 130, and short sides of racks 641. Referring to FIG. 6A, a shaded vertex 610A represents the base station, and other unshaded vertices (e.g., 610B through 610H) represent locations the robot can visit for navigation or scanning inventory information. For example, pallet locations are represented by vertices 610D and 610E located on a side of rack 630A, where the robot may turn towards the rack to scan inventory pallets.

Each vertex may be assigned to a class based on its location. Some examples of classes include, and is not limited to, ground/base station, rack stacking, and floor stacking. Vertex classes can be added depending on the storage site configuration. In the illustrated example, vertex 610A and 610B belong to the ground/base station class, while the rest of the depicted vertices belong to the rack stacking class. Vertices may have different sets of metrics depending on its class. For example, for a vertex 610A representing the base station may have a name of a storage site as an assigned vertex metric to match the topometric map to a storage site stored in the warehouse management system 520. A vertex located on a short side of a rack 641 may have metrics such as the vertex's global position within the storage site 110 in terms of the three-dimensional cartesian coordinate system, a depth of the rack at which the vertex is located, and a width of the aisle 640 (e.g., distance between rack 630B and 630C). A vertex located in the aisle facing the pallets may have metrics such as the vertex's global position within the storage site, a beam span, and beam length. Vertices are labeled based on a unified numbering system, which will be discussed in further detail with reference to FIG. 7.

Edges are generated between neighboring vertices using a floorplan of the storage site. For example, an edge 620A is generated between the vertex 610A at the base station 130 and vertex 610B of the hovering location above the base station to indicate a traversable path for the robot 120. As illustrated in this example, an edge may be generated between a vertex located on a short side of a rack 641 (e.g., 610C) and a vertex at the first column of the first cell on the rack. Vertices located in the same aisle that share the same flight level and same column of a cell on a rack, may be connected. For example, an edge may be generated between vertex 610G and vertex 610H if they are on the same flight level. If there exists a structure that obstructs a path between two neighboring vertices, an edge may not be generated between the two vertices. For example, an edge would not be generated between vertices 610D and 610G due to racks 630A and 630B obstructing a path between the vertices.

Each edge between a parent and child vertex may have a set of metrics (e.g., four) that represent the coordinates of the vertices. In some embodiments, the use of "parent" and "child" merely implies a pair of vertices, but it does not imply any hierarchy of one vertex over another. In some embodiments, a cartesian coordinate system may be used, although in other embodiments other suitable coordinate systems may also be implemented. Using a cartesian coordinate system as an example, the metrics include, and is not limited to, a translational difference between the parent and child vertex in the three-dimensional cartesian coordinate system (i.e., x, y, and z-axis), and a rotational difference measured about the z-axis from the parent to the child vertex. In one embodiment, the topometric map is first generated with minimal metric information. The metrics of the vertices and edges associated with a flight path from the base station 130 to the closest rack may be predefined, while the metrics of other vertices and edges in the map are initialized to an arbitrary value.

Figure 6B:
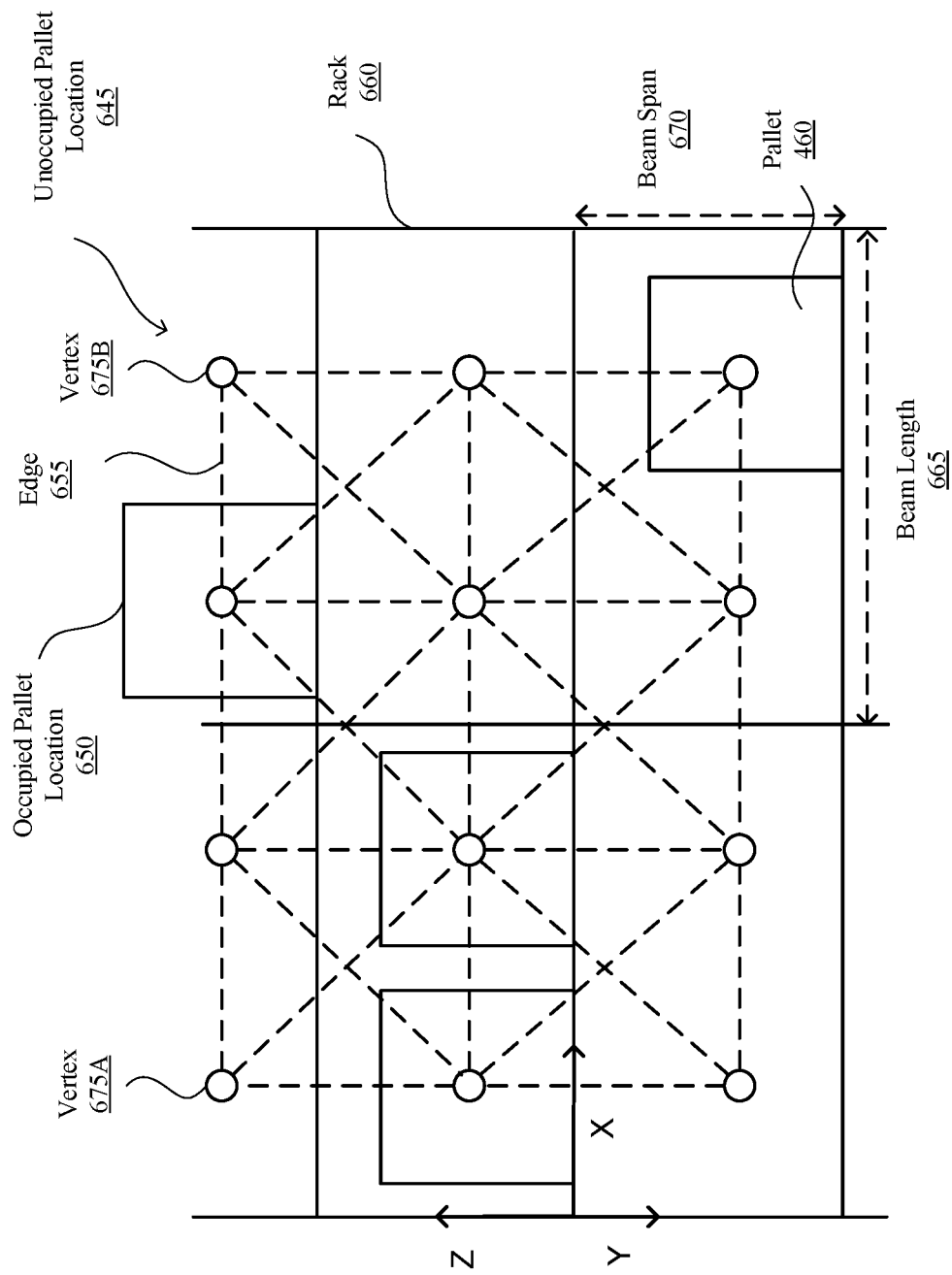
FIG. 6B is a conceptual diagram that illustrates a visualization of a topometric map from a side view of a rack, according to an embodiment.

FIG. 6B is a conceptual diagram that illustrates a visualization of a topometric map from a side view of a rack, according to an embodiment. Illustrated in this example, vertices are generated for every pallet location on a rack 660. A pallet location may be a location occupied 650 by a pallet or is currently unoccupied 645 but will be occupied by a pallet. The pallet location may be defined as the center of the pallet, a corner of the pallet, an equally divided beam length if one or more pallets are placed, a certain percentage of height of a beam span, or any suitable measure that may be used to define vertex relative to a pallet or an unoccupied location. For every vertex on the rack, edges are generated between the vertex and one or more immediate neighboring vertices. For example, in the example illustrated FIG. 6B, edges are connecting all immediate neighboring vertices, but in some embodiments additional restrictions may be applied in defining an edge. For example, in some embodiments, within an aisle, only leveled flight is allowed so that no diagonal edges are used. In the illustrated example shown in FIG. 6B, vertices located at the first column of the left cells (e.g., vertex 675A) and vertices located at the second column of the right cells (e.g., vertex 675B) may be additionally connected to a vertex located on the short sides of the rack. Beam span 670 and beam length 665 are vertex metrics for vertices located at pallet locations, such as those depicted in FIG. 6B.

Example Navigation Process

Figure 7:
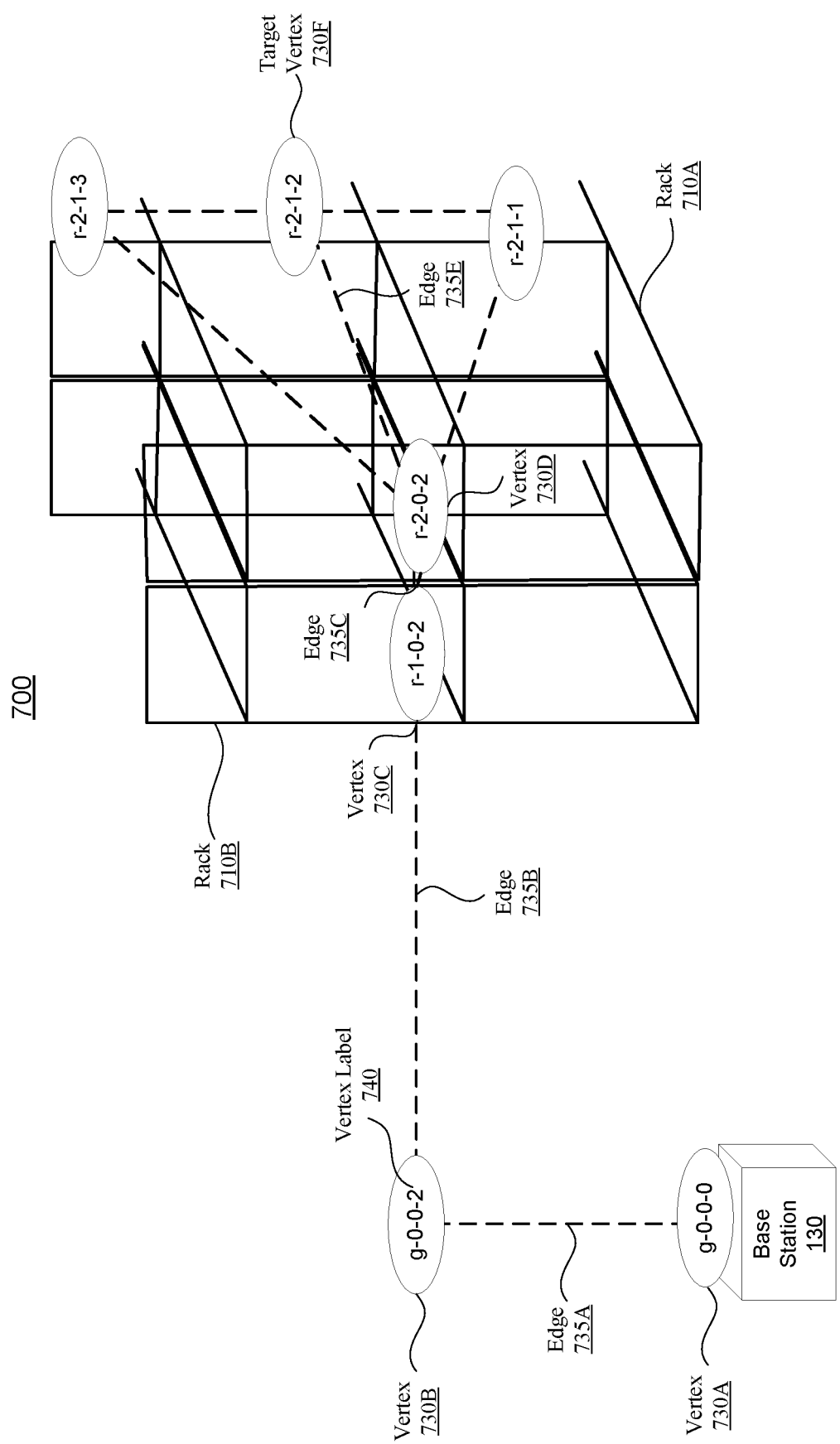
FIG. 7 is a conceptual diagram depicting another view of a visualization of a generated topometric map in a storage site, according to an embodiment.

FIG. 7 is a conceptual diagram depicting another view of a visualization of a generated topometric map in a storage site, according to an embodiment. As illustrated, the vertices are labeled using a locally used unified numbering system. The default numbering system of the storage site used by the storage site administrator (e.g., a company that owns the inventory, a warehouse management administrator, a retailer selling the inventory) to identify specific locations within the storage site, is translated to a locally used unified numbering system. The unified numbering system enables the standardization of different storage site numbering systems, which simplifies the robot deployment process across different storage sites. The unified numbering system allows any location in a storage site to be identified by a combination of location characteristics. In some embodiments, a vertex label 740 may be defined as having a vertex class, followed by an identifying number of a rack, stack or base station, followed by a column number within a cell on the rack, followed by a flight level. For example, a vertex label 740 of r2-1-3 represents a vertex that has a rack stacking vertex class, and is located at rack number 2, in column number 1 of a cell on the rack, and at a flight level of 3. In contrast, vertices located at the short side of the rack (e.g., 730C, 730D) may be labeled with 0 for the column number.

Figure 8:
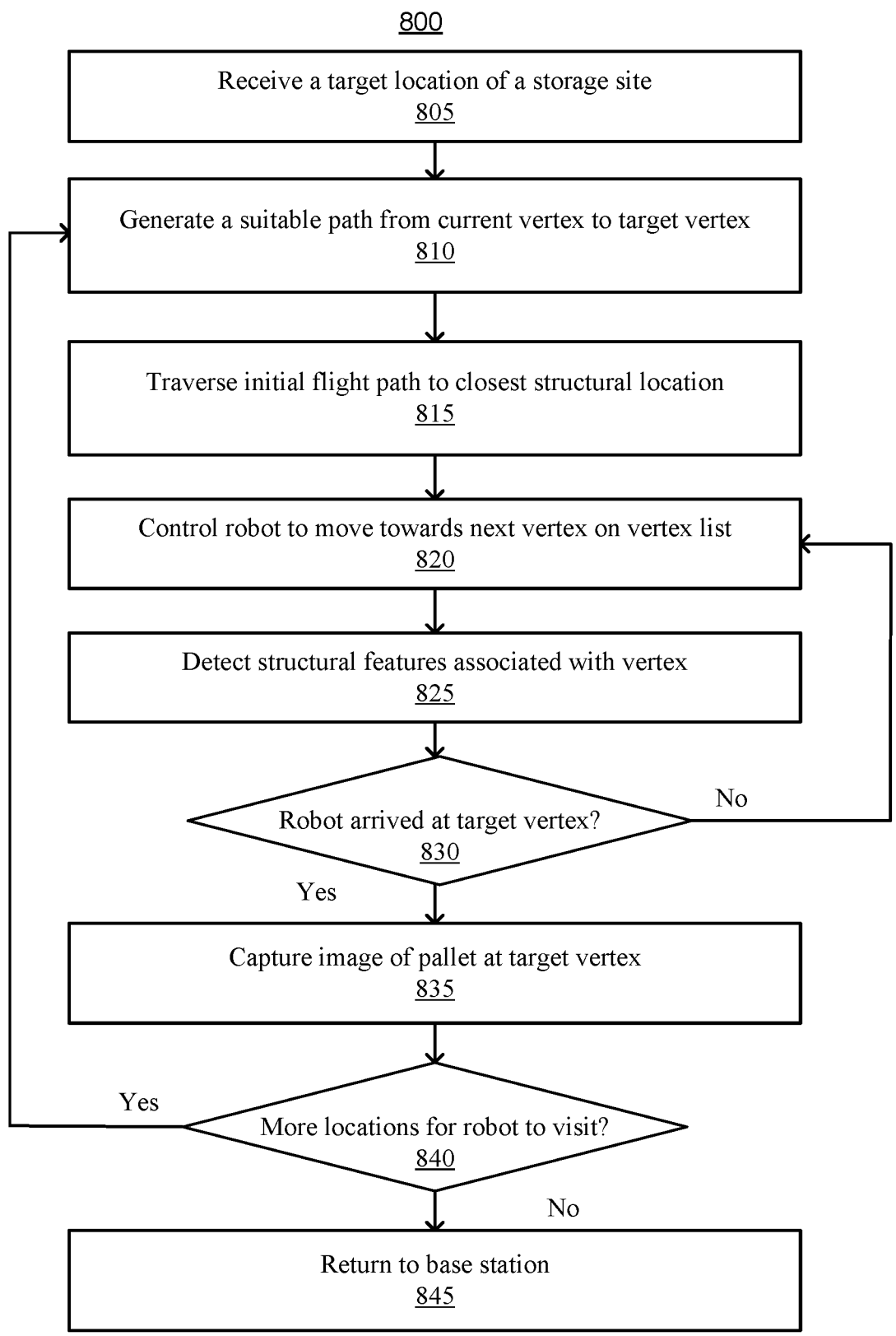
FIG. 8 is a flowchart depicting an example navigation process of a robot, according to an embodiment.

Referring to FIG. 8 in conjunction with FIG. 7, FIG. 8 is a flowchart depicting an example navigation process of a robot 120, according to an embodiment. The robot 120 receives 805 a target vertex located in a storage site 110. The target vertex may be the final destination or an intermediate destination for a task to be performed by the robot 120. The target vertex may be received as an input command from the warehouse management system 520. The input command may also include the action that the robot 120 needs to take, such as taking a picture at the target vertex to capture the barcodes and labels of inventory items. The robot 120 may rely on the state estimator 235, which includes the VIO unit 236 and the height estimator 238 to generate localization information. In the illustrated embodiment, the starting location of a route is the base station 130. In other embodiments, the starting location of a route may be any location at the storage site 110. For example, the robot 120 may have recently completed a task and started another task without returning to the base station 130. The planner 250 sends a request to the topometric map manager 245 for a suitable path between its current vertex and a destination vertex.

In response to the received request, the topometric map manager 245 may generate 810 a suitable path from the current vertex to the target vertex, with includes a list of vertices and associated vertex and edge metrics. The topometric map manager 245 may determine the suitable path between two vertices based on the cost of the edges of candidate flight paths. The suitable path may be the lowest-cost path or may be another path with a sufficiently low cost but other factors may affect the selection of the path. For example, in some embodiments, the lowest-cost path may be temporarily obstructed or there may be another robot along the path so that another path is selected.

The selection of path may be based on calculation of the total cost traversing a candidate path. Each edge has an associated cost metric. The cost metric may take the form of energy, length, time, the number of difficult maneuvers (e.g., certain action may be more difficult to perform by the robot 120 than other actions), and other metrics. The total cost may also be a composite metric that takes into account of different types of cost metrics. While lengths are used as an example type of cost metric below, other cost metrics may also be used. Also, while minimizing cost is used as an example in determining routing, in some embodiments, the routing may also be determined based on maximizing certain metrics, such as the number of tasks (e.g., taking photos of pallets) that the robot 120 may be able to perform along a candidate path.

By way of example, the cost metric of an edge may be calculated using $V_{[xy]}$, $V_{[z]}$, $V_{[\theta]}$, which may be generated by the state estimator 235. $V_{[xy]}$ may represent the translational difference between two vertices, which is the distance between two vertices in the x-y direction, and $V_{c[xy]}$ and $V_{p[xy]}$ represents the vector between the child and parent vertices in the x-y plane. $V_{[z]}$ may represent the height difference between the vertices, with $V_{c[z]}$ and $V_{p[z]}$ representing the height of the child and parent vertex, respectively. $V_{[\theta]}$ may represent the rotational difference between two vertices, which is the angle measurement of rotation around the z-axis. $V_{c[\theta]}$ is the orientation of the child vertex around the z-axis, while $V_{p[\theta]}$ is the orientation of the parent vertex around the z-axis. The cost of an edge may be calculated using the following mathematical equation, where $\alpha$ and $\beta$ are predefined constants.

$$\delta_{p,c} = \|V_{c[xy]} - V_{p[xy]}\| + \alpha * |V_{c[z]} - V_{p[z]}| + \beta * |V_{c[\theta]} - V_{p[\theta]}|$$

Algorithms that may be used to identify the path with minimal cost include, and is not limited to, Dijkstra's algorithm, Bellman-Ford algorithm, Floyd-Warshall algorithm, Johnson's algorithm, Prim's algorithm, A* search algorithm, and Viterbi algorithm. The topometric map manager may identify candidate flight paths from a source vertex to a destination vertex. The topometric map manager may sum up the edge metrics of candidate paths between the source vertex and destination vertex and select the flight path with minimal cost.

The robot may use predefined vertex and edge metrics to traverse 815 an initial flight path from a current vertex to a closest regularly shaped structure. The vertex and edge metrics associated with the initial flight path may be predefined by an administrator. The robot may rely on the perception engine 205 to detect a structural component of the regularly shaped structure associated with vertex 730C to aid in navigating towards a vertex. As the robot navigates, the robot 120 may use the image sensor 210 of the perception engine to capture images of the storage site 110. The images captured may be in a sequence of images. The images may capture the objects in the environment, including the regularly shaped structures such as the racks. The robot 120 may use the algorithms in the visual reference engine 240 to visually recognize the regularly shaped structures.

The planner 250, controls 820 the robot to move towards the next vertex on the route specified by the vertex list of the path. The behavior of the robot between vertices may be determined by the planner 250 based on the vertex label of the current vertex and next vertex. Examples of behaviors the robot may perform include, and is not limited to, takeoff, moving to the nearest rack, moving to the next rack, entering an aisle, exiting an aisle, moving to the ground station, and landing on the ground station. For example, if the current location of the robot 120 is vertex 730C and its next location is 730D, the planner 250 may determine the robot's behavior as 'move to next rack' based on the change in rack number between the vertex labels of vertex 730C and 730D.

The robot 120 detects 825 regularly shaped structures to determine if it has arrived at a vertex. The planner 250 may use the perception engine 205 to capture images of objects in the environment, including the regularly shaped structures such as the racks. The robot 120 may use the algorithms in the visual reference engine 240 to visually recognize the regularly shaped structures. For example, the robot may use the perception engine 205 to detect the side of the rack to verify that it is at vertex 730D. The planner 250 determines if the robot has arrived 830 at the target vertex by checking the vertex list. If not, the robot 120 continues navigating through the remaining vertices until the target vertex is reached.

Upon reaching the target vertex, the robot 120 performs the action specified by the input command, such as capturing 835 a picture of the pallet at the target vertex. The planner 250 uses the perception engine 205 and state estimator 235 to align the robot with the center of the pallet before capturing the picture. The alignment process will be discussed in further detail with reference to FIG. 10.

The planner 250 determines if the robot 120 has more 840 locations left to visit. If not, the robot returns 845 to the base station following a similar process. The planner 250 requests the topometric map manager 245 to generate a return path back to the base station 130 and determines the robot's sequence of behaviors based on the return path. The return path may also be a path with the lowest cost, such as the shortest path. The robot navigates back to the base station following the returns path and lands at the base station. Otherwise, the robot requests the topometric map manager to generate 810 a continuing path to the next pallet location and the process is repeated until there are no more locations for the robot 120 to visit.

Referring to FIG. 7, the target vertex 730F is vertex r-2-1-2 and the robot's starting point is the base station 130. The topometric map manager may generate a vertex list that includes vertices 730A, 730B, 730C, 730D, 730F in this specific order. The planner 250 receives the list and uses it to determine the sequence of actions performed by the robot 120 while navigating between vertices. The planner 250 may determine that for edge 735A, the behavior that the robot should perform is 'takeoff'. Accordingly, the planner controls the robot to move upwards. For edges 735B and 735C, the planner may determine that the robot should 'move to the nearest rack' followed by 'move to the next rack' for which the robot moves a predefined distance and direction towards the specified racks. The planner may determine that the robot should 'enter the aisle' for edge 735E and control the robot 120 located at vertex 730D to turn counterclockwise and enter the target aisle, arriving at the target vertex.

Upon arriving at the target vertex 730F, the planner 250 may use the perception engine 205 to align the robot with the target pallet. The planner may use the perception engine 205 to capture an image of the pallet located at the target vertex 730F. In this example, there are no remaining locations left for the robot to visit. The planner 250 requests the topometric map manager 245 for a shortest path back to the base station and determines the behaviors the robot 120 performs. The robot navigates through the shortest path and lands on the base station.

Example Metric Update Process

Figure 9:
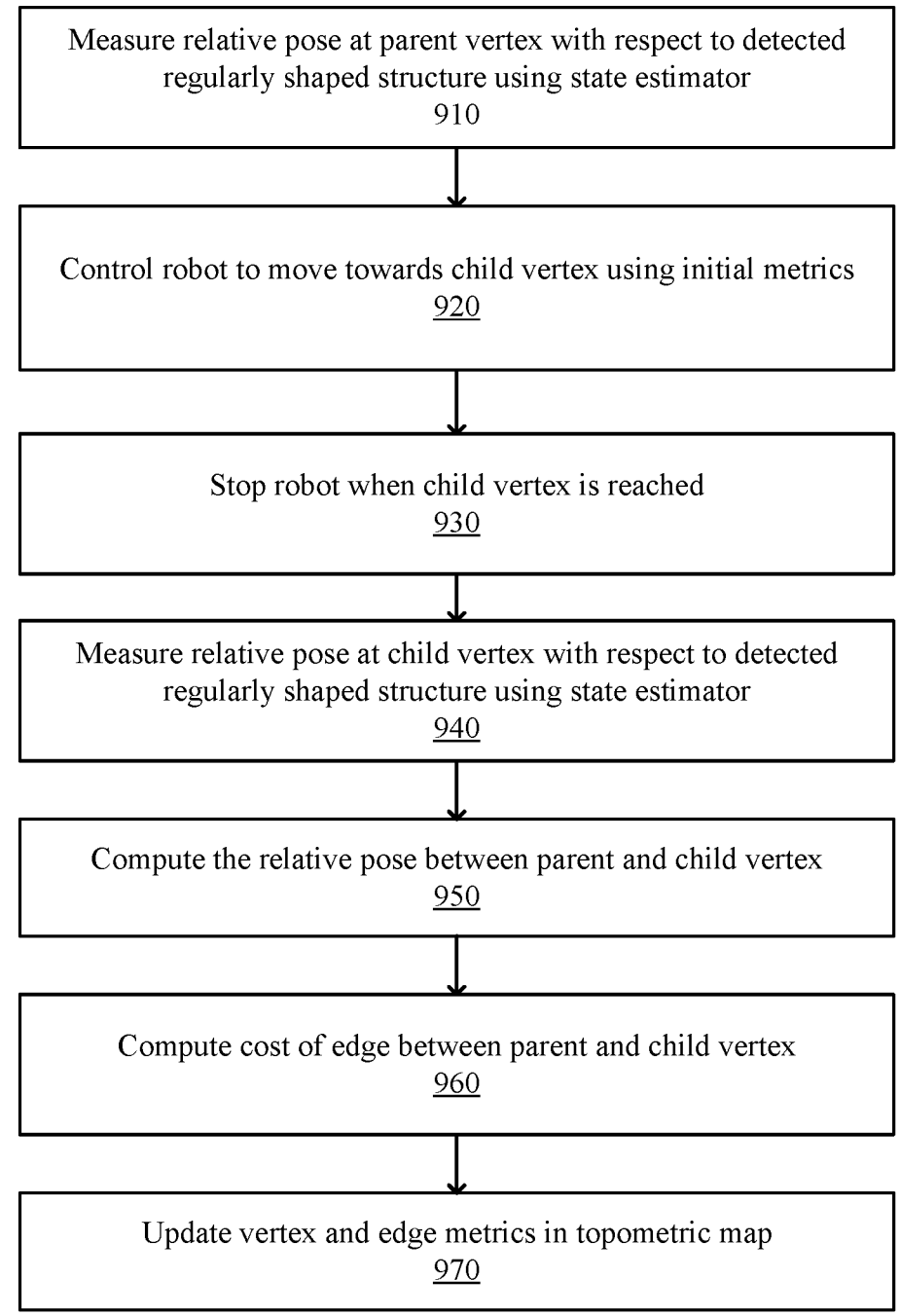
FIG. 9 is a flowchart depicting an example process for updating the topometric map, according to an embodiment.

FIG. 9 is a flowchart depicting an example update process of vertex and edge metrics, according to an embodiment. The robot updates the metrics of vertices and edges of the topometric map as it navigates the storage site 110. The planner 250 measures 910 the relative pose of the robot located at a parent vertex with respect to a regularly shaped structure using the perception engine 205 and the state estimator 235. In an embodiment, the relative pose measurements may include relative translation and orientation difference measurements between the parent and child vertex. The relative pose measurements may include $\hat{x}$, $\hat{y}$, $\hat{z}$, and $\hat{\psi}$ which are generated by the state estimator 235. $\hat{x}$ and $\hat{y}$ may be the relative translation generated by the state estimator 235. $\hat{z}$ may be the height estimate generated by the state estimator 235. $\hat{\psi}$ may be the yaw angle of the robot.

The global position of the parent vertex may be calculated using the relative pose measurements of the vertex with respect to the regularly shaped structure. The global position may include the coordinates of the vertex in three-dimensional cartesian coordinate system, such as x, y, and z coordinates. The planner 250 controls 920 the robot to move towards the child vertex along an edge. The planner 250 uses initial metrics of the edge, such as direction, to navigate the robot 120. The robot 120 uses the images captured by the image sensor 210 of the perception engine 205 to determine the current location of the robot with respect to the flight path by detecting features of regularly shaped structures. For example, detecting the side of a rack may indicate to the robot that it has arrived at a vertex located at the short side of the rack 641.

The robot 120 stops 930 when it has detected that it has reached the child vertex. The planner 250 measures 940 the relative pose of the robot located at the child vertex with respect to a regularly shaped structure using the perception engine 205 and the state estimator 235. Similarly, the global position of the child vertex may be calculated using the relative pose measurements of the vertex with respect to the regularly shaped structure. The planner 250 receives the relative pose measurements of the parent and child vertex with respect to the regularly shaped structure and may use them to compute 950 the relative pose between the parent and child vertices. The planner may use values of the relative pose measurements to calculate 960 the cost of the edge between the parent and child vertex. The planner 250 requests the topometric map manager to update 970 the metrics of the parent and child vertices, and the edge in the topometric map.

While navigating the storage site, the robot may also update the value of the vertex metrics such as the beam span, and beam length. The planner 250 requests the perception engine 205 to measure the beam span. If the perception engine 205 is unable to detect both the lower and upper beam, the planner 250 instructs the perception engine 205 to measure the robot's offset from the lower beam. The robot moves upward until the upper beam is detected by the perception engine 205. Once the upper beam is detected, the planner 250 instructs the perception engine measure the robot's offset from the upper beam. The planner 250 may calculate the beam span by adding the offset from the upper beam, the distance the robot traveled, and the offset from the lower beam.

The beam length may be calculated in a similar manner. The planner 250 requests the perception engine 205 to measure the beam length. If the perception engine 205 is only able to detect the left upright frame, the planner 250 requests the perception engine 205 to calculate the robot's offset from the left upright frame. The planner 250 may instruct the robot to move to the right until the right upright frame is detected. The planner 250 may calculate the beam length by adding the robot's offset from the left upright frame, the robot's offset from the right upright frame, and the distance the robot traveled. The planner 250 may request the topometric map manager to update the beam span and beam length metrics of the vertices.

Additionally, the robot 120 may update the value of the vertex metrics such as the rack depth, and rack interval. The rack depth can be measured by perception engine 205 when the robot 120 is positioned towards the short side of rack 641. The perception engine 205 can compute the rack depth by measuring the distance between the left upright frame and right upright frame of the short side of rack 641, when both left and right upright frames of the short side of rack can be observed simultaneously from the drone. The rack interval may be calculated in similar manner to the beam length. The planner 250 instructs the perception engine 205 to calculate the robot's 120 offset from the right upright frame at the current short side of rack 641. The planner 250 may instruct the robot 120 to move to the right until the short side of another rack is detected by the perception engine 205. The planner 250 may calculate the rack interval between two adjacent racks positioned in parallel to each other. The planner 250 subtracts the measurement of the robot's 120 offset from the right upright frame at a short side of a first rack and the measurement of the robot's 120 offset from the left upright frame at a short side of a second rack, from the distance the robot 120 traveled from the first rack to the second rack. The planner 250 may request the topometric map manager 245 to update the rack depth and rack interval metrics of the vertices.

Figure 10:
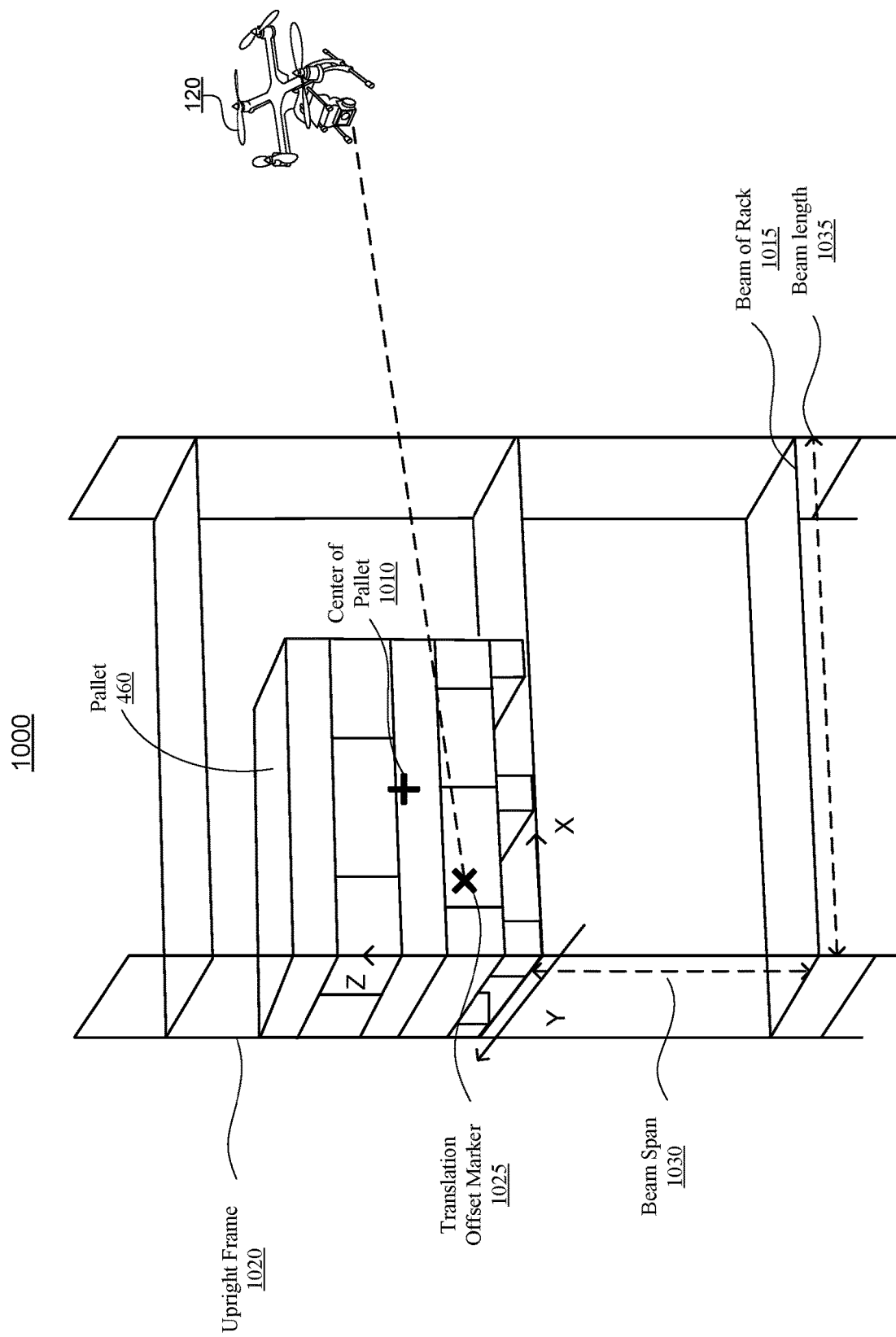
FIG. 10 is a conceptual diagram illustrating the use of relative offsets from the center of a pallet as the robot aligns itself with the center of the pallet.

FIG. 10 is a conceptual diagram illustrating the use of relative offsets from a reference location of a pallet (e.g., the center, a corner, etc.) as the robot aligns itself with the reference location of the pallet, according to an embodiment. The planner 250 requests the perception engine 205 to measure relative offsets from the rack coordinate to the robot 120. The relative offsets include the distance between a regularly shaped structure and the robot 120, the orientation offset of the robot with respect to the regularly shaped structure, and the translation offset of the robot in the rack coordinate. The distance between the robot 120 and the rack is the distance measured along the y-axis. The orientation offset of the robot 120 with respect to the rack is the orientation difference about the z-axis. The translation offset of the drone with respect to the rack coordinate is given by the z and x coordinates of the cross marker 1025. The planner 250 may use the relative offset measurements to calculate the relative pose of the reference location of the pallet 1010 (e.g., center) with respect to the cross marker 1025. The planner 250 may use the relative pose to align the robot 120 with the reference location of the pallet 1010 before it instructs the perception engine 205 to take a picture of the pallet.

Additional Configuration Information

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method for autonomously navigating an inventory robot in a storage site, the method comprising:
generating a topometric map which contains layout information of the storage site, the topometric map comprising vertices representing locations of the storage site and edges that connect the vertices, wherein the topometric map is a three-dimensional map, a subset of the vertices represent pallet locations in the storage site, each vertex in the subset is associated with location coordinates as metrics of the vertex, and an edge is associated with one or more metrics that define a cost between two vertices connected by the edge;
updating a value of a metric of the topometric map through the inventory robot moving in the storage site in capturing an updated value of the metric, wherein updating the value of the metric of the topometric map through the inventory robot moving in the storage site in capturing the updated value of the metric comprises:
measuring a relative pose of the inventory robot at a parent vertex and at a child vertex, wherein the parent vertex represents a starting location along a path and the child vertex represents a subsequent location connected to the parent vertex via an edge, and wherein the relative pose is with respect to a reference structure in the storage site,
calculating a cost associated with the edge connecting the parent vertex and the child vertex based on the measured relative pose, wherein the cost comprises one or more of a planar distance, a vertical displacement, or an angular rotation between the vertices, and
updating one or more metrics in the topometric map based on the calculated cost, the updated metrics being associated with the edge connecting the parent vertex and the child vertex;
determining a path to a target pallet location by calculating a total cost of traversing one or more edges in the topometric map along the path; and
directing the inventory robot to navigate in the storage site according to the path.

2. The method of claim 1, wherein generating the topometric map further comprises:
generating a layout of storage racks in the storage site, based on a default numbering system of the storage site;
translating the default numbering system into a locally used unified numbering system;
generating vertices for pallet locations and structural locations;
generating edges between neighboring vertices; and
assigning predefined metrics for vertices and edges.

3. The method of claim 2, wherein the storage racks comprise rows and columns.

4. The method of claim 1, wherein one of the vertices of the topometric map is represented as a combination of location values, which indicate a position of one of the vertices in context of the storage site, and wherein one of the edges of the topometric map is represented as a combination of metric values, which includes a cost for traversing an edge.

5. The method of claim 4, wherein one of the edges connecting to a ground station is predefined, and the metric values of a plurality of remaining edges of the topometric map are captured through the inventory robot moving in the storage site.

6. The method of claim 1, wherein an instruction for updating the value of a metric of an edge of the topometric map comprises instructions for:
detecting, with a camera, a feature of a structural location associated with a source vertex;
measuring, with the camera, a relative pose of the source vertex with respect to the structural location associated with the source vertex;
moving the inventory robot in a predefined direction until a structural location associated with a destination vertex is detected by the camera;

measuring, with the camera, a relative pose of the destination vertex with respect to the structural location associated with the destination vertex;

calculating, using a state estimator, the relative pose between source and destination vertices; and updating the metric of the edge with the relative pose between the source and destination vertices.

7. The method of claim 4, wherein the cost associated with an edge that connects a parent and child vertex is calculated using translational and rotational differences between the parent and child vertex.

8. The method of claim 1, wherein determining the path to the target pallet location further comprises:

generating a list of vertices that make up the path; and determining a sequence of actions performed by the inventory robot to navigate from source vertex to destination vertex, based in part on vertex metrics and corresponding edge metrics.

9. An inventory robot, comprising:

a sensor configured to perform measurement of a storage site;

one or more computer processors; and memory coupled to one or more computer processors, the memory storing one or more sets of instruction, the one or more sets of instructions, when executed by the one or more computer processors, cause the one or more computer processors to:

receive a topometric map which contains layout information of the storage site, the topometric map comprising vertices representing locations of the storage site and edges that connect the vertices, wherein the topometric map is a three-dimensional map, a subset of the vertices represent pallet locations in the storage site, each vertex in the subset is associated with location coordinates as metrics of the vertex, and an edge is associated with one or more metrics that define a cost between two vertices connected by the edge;

provide an updated value of a metric of the topometric map through performing measurement using the sensor capturing an updated value of the metric, wherein updating the value of the metric of the topometric map through the inventory robot moving in the storage site in capturing the updated value of the metric comprises:

measuring a relative pose of the inventory robot at a parent vertex and at a child vertex, wherein the parent vertex represents a starting location along a path and the child vertex represents a subsequent location connected to the parent vertex via an edge, and wherein the relative pose is with respect to a reference structure in the storage site, calculating a cost associated with the edge connecting the parent vertex and the child vertex based on the measured relative pose, wherein the cost comprises one or more of a planar distance, a vertical displacement, or an angular rotation between the vertices, and updating one or more metrics in the topometric map based on the calculated cost, the updated metrics being associated with the edge connecting the parent vertex and the child vertex;

determine a path to a target pallet location through calculating a total cost of traversing one or more edges in the topometric map along the path; and direct the inventory robot to navigate in the storage site according to the path.

10. The inventory robot of claim 9, wherein an instruction for generating the topometric map comprises instructions for:

generating a layout of storage racks in the storage site, based on a default numbering system of the storage site;

translating the default numbering system into a locally used unified numbering system;

generating vertices for pallet locations and structural locations;

generating edges between neighboring vertices; and assigning predefined metrics for vertices and edges.

11. The inventory robot of claim 10, wherein the storage racks comprise rows and columns.

12. The inventory robot of claim 9, wherein one of the vertices of the topometric map is represented as a combination of location values, which indicate a position of one of the vertices in context of the storage site, and wherein one of the edges of the topometric map is represented as a combination of metric values, which includes a cost for traversing an edge.

13. The inventory robot of claim 12, wherein one of the edges connecting to a ground station is predefined, and the metric values of a plurality of remaining edges of the topometric map are captured through the inventory robot moving in the storage site.

14. The inventory robot of claim 9, wherein an instruction for updating the value of a metric of an edge of the topometric map comprises instructions for:

detecting, with a camera, a feature of a structural location associated with a source vertex;

measuring, with the camera, a relative pose of the source vertex with respect to the structural location associated with the source vertex;

moving the inventory robot in a predefined direction until a structural location associated with a destination vertex is detected by the camera;

measuring, with the camera, a relative pose of the destination vertex with respect to the structural location associated with the destination vertex;

calculating, using a state estimator, the relative pose between source and destination vertices; and updating the metric of the edge with the relative pose between the source and destination vertices.

15. The inventory robot of claim 12, wherein the cost associated with an edge that connects a parent and child vertex is calculated using translational and rotational differences between the parent and child vertex.

16. The inventory robot of claim 9, wherein determining the path to the target pallet location further comprises:

generating a list of vertices that make up the path; and determining a sequence of actions performed by the inventory robot to navigate from source vertex to destination vertex, based in part on vertex metrics and corresponding edge metrics.

17. A system comprising:

a computing server configured to generate a topometric map which contains layout information of a storage site, the topometric map comprising vertices representing locations of the storage site and edges that connect the vertices, wherein the topometric map is a three-dimensional map, a subset of the vertices represent pallet locations in the storage site, each vertex in the subset is associated with location coordinates as metrics of the vertex, and an edge is associated with one or more metrics that define a cost between two vertices connected by the edge; and an inventory robot in communication with the computing server, the inventory robot configured to:
update a value of a metric of an edge of the topometric map through the inventory robot moving in the storage site in capturing an updated value of the metric, wherein updating the value of metric of the topometric map through the inventory robot moving in the storage site in capturing the updated value of the metric comprises:
measuring a relative pose of the inventory robot at a parent vertex and at a child vertex, wherein the parent vertex represents a starting location along a path and the child vertex represents a subsequent location connected to the parent vertex via an edge, and wherein the relative pose is with respect to a reference structure in the storage site,
calculating a cost associated with the edge connecting the parent vertex and the child vertex based on the measured relative pose, wherein the cost comprises one or more of a planar distance, a vertical displacement, or an angular rotation between the vertices, and
updating one or more metrics in the topometric map based on the calculated cost, the updated metrics being associated with the edge connecting the parent vertex and the child vertex;
determine a path to a target pallet location by calculating a total cost of traversing one or more edges in the topometric map along the path; and
navigate in the storage site according to the path.

18. The system of claim 17, wherein an instruction for generating the topometric map comprises instructions for:
generating a layout of storage racks in the storage site, based on a default numbering system of the storage site;
translating the default numbering system into a locally used unified numbering system;
generating vertices for pallet locations and structural locations;
generating edges between neighboring vertices; and
assigning predefined metrics for vertices and edges.

19. The system of claim 17, wherein an instruction for updating the value of a metric of an edge of the topometric map comprises instructions for:
detecting, with a camera, a feature of a structural location associated with a source vertex;
measuring, with the camera, a relative pose of the source vertex with respect to the structural location associated with the source vertex;
moving the inventory robot in a predefined direction until a structural location associated with a destination vertex is detected by the camera;
measuring, with the camera, a relative pose of the destination vertex with respect to the structural location associated with the destination vertex;
calculating, using a state estimator, the relative pose between source and destination vertices; and
updating the metric of the edge with the relative pose between the source and destination vertices.

20. The system of claim 17, wherein an instruction for determining the path to the target pallet location further comprises instructions for:
generating a list of vertices that make up the path; and
determining a sequence of actions performed by the inventory robot to navigate from source vertex to destination vertex, based in part on vertex metrics and corresponding edge metrics.

* * * * *